(12) United States Patent
Anastas et al.

(10) Patent No.: US 7,685,273 B1
(45) Date of Patent: Mar. 23, 2010

(54) METHODS AND APPARATUS FOR COLLECTING AND DISPLAYING PERFORMANCE METRICS FROM A WEB SITE

(75) Inventors: Paul Anastas, Needham, MA (US); William Ryan Breen, Melrose, MA (US); Vernon A. Brewer, III, Allston, MA (US); Christopher M. Shaw, Boxford, MA (US)

(73) Assignee: Compuware Corporation, Detroit, MI (US)

( * ) Notice: Subject to any disclaimer, the term of this patent is extended or adjusted under 35 U.S.C. 154(b) by 693 days.

(21) Appl. No.: 11/471,319

(22) Filed: Jun. 20, 2006

Related U.S. Application Data

(63) Continuation-in-part of application No. 11/223,264, filed on Sep. 9, 2005, which is a continuation-in-part of application No. 11/094,338, filed on Mar. 30, 2005, now abandoned.

(60) Provisional application No. 60/557,994, filed on Mar. 31, 2004, provisional application No. 60/592,813, filed on Jul. 30, 2004.

(51) Int. Cl.
*G06F 15/173* (2006.01)
(52) U.S. Cl. ........................ 709/224; 715/234
(58) Field of Classification Search .................. 709/224
See application file for complete search history.

(56) References Cited

U.S. PATENT DOCUMENTS

| | | | |
|---|---|---|---|
| 6,886,132 B1 * | 4/2005 | Hall et al. ................... | 715/234 |
| 7,076,495 B2 * | 7/2006 | Dutta et al. .................. | 707/102 |
| 7,392,321 B1 * | 6/2008 | Wolf et al. ................... | 709/232 |
| 2003/0046029 A1 * | 3/2003 | Wiener et al. ............... | 702/186 |
| 2003/0208593 A1 * | 11/2003 | Bharati et al. .............. | 709/224 |

OTHER PUBLICATIONS

Palme et al. MIME Encapsulation of Aggregate Documents, such as HTML (MHTML). Mar. 1999.*
Sigurdsson et al. Heritrix 0.8.0 User Manual. May 24, 2004.*

* cited by examiner

*Primary Examiner*—Vivek Srivastava
*Assistant Examiner*—Bryan Lee
(74) *Attorney, Agent, or Firm*—Fenwick & West LLP

(57) ABSTRACT

A system obtains a script containing at least one transaction to be performed with the web site, the at least one transaction defining a sequence of page requests identifying at least one web page to obtain from the web site. The system executes the script to perform the at least one transaction, performance of the at least one transaction including retrieving the sequence of the at least one web page. The system detects a capture event associated with the at least one web page, and in response to the capture event, captures content of the at least one web page. The system packages the content of the at least one web page into a container capable of being rendered, such that the container provides a plurality of components associated with the at least one captured web page, and delivers the container to a repository.

22 Claims, 18 Drawing Sheets

206 IN RESPONSE TO THE CAPTURE EVENT, CAPTURE CONTENT OF THE AT LEAST ONE WEB PAGE

207 IDENTIFY IN THE SCRIPT, A CAPTURE EVENT DEFINITION INDICATING A CONDITION THAT MAY EXIST DURING RETRIEVAL OF THE AT LEAST ONE WEB PAGE IN THE AT LEAST ONE TRANSACTION, THE CAPTURE EVENT INCLUDING AT LEAST ONE OF:
i) A USER DEFINED CAPTURE EVENT
ii) AN ERROR CAPTURE EVENT

208 IDENTIFY A USER DEFINED CAPTURE EVENT INCLUDING AT LEAST ONE OF:
i) A TIMING THRESHOLD, SPECIFIED BY A USER, THAT HAS BEEN EXCEEDED
ii) A USER SUPPLIED TEST DATUM THAT DOES NOT MATCH WITH A COMPONENT OF THE WEB PAGE
iii) A USER SUPPLIED TEST DATUM THAT PURPOSELY TRIGGERS A FALSE ERROR

OR

209 IDENTIFY AN ERROR CAPTURE EVENT INCLUDING AT LEAST ONE OF:
i) A TIMING THRESHOLD THAT HAS BEEN EXCEEDED
ii) A UNIVERSAL RESOURCE LOCATOR ERROR THAT HAS OCCURRED
iii) A NETWORK ERROR THAT HAS OCCURRED
iv) AN OBJECT ERROR THAT HAS OCCURRED, THE OBJECT IDENTIFIED AS A COMPONENT OF THE WEB PAGE
v) A BYTE COUNT ASSOCIATED WITH THE AT LEAST ONE WEB PAGE

*FIG. 11*

```
┌─────────────────────────────────────────────────────────────────────────┐
│ 210 IN RESPONSE TO THE CAPTURE EVENT, CAPTURE CONTENT OF THE AT LEAST   │
│ ONE WEB PAGE                                                            │
│                                                                         │
│   ┌─────────────────────────────────────────────────────────────────┐   │
│   │ 211 RECEIVE A REQUEST TO CAPTURE THE CONTENT OF THE AT LEAST    │   │
│   │ ONE WEB PAGE UPON AN OCCURRENCE OF AN ERROR ON THE AT           │   │
│   │ LEAST ONE WEB PAGE, THE REQUEST PROVIDED BY A SWITCH IN THE     │   │
│   │ SCRIPT EXECUTING TO MONITOR THE AT LEAST ONE WEB PAGE           │   │
│   └─────────────────────────────────────────────────────────────────┘   │
│                                                                         │
│                                    OR                                   │
│                                                                         │
│   ┌─────────────────────────────────────────────────────────────────┐   │
│   │ 212 RECEIVE A REQUEST TO CAPTURE AT LEAST ONE OF:               │   │
│   │ i) A VISUAL REPRESENTATION OF LOCALLY STORED CONTENT            │   │
│   │ RENDERED IN A WEB BROWSER                                       │   │
│   │ ii) AT LEAST ONE HEADER ASSOCIATED WITH THE AT LEAST ONE WEB    │   │
│   │ PAGE                                                            │   │
│   │ iii) A TRACE ROUTE ASSOCIATED WITH THE AT LEAST ONE WEB PAGE    │   │
│   └─────────────────────────────────────────────────────────────────┘   │
│                                                                         │
│                                    OR                                   │
│                                                                         │
│   ┌─────────────────────────────────────────────────────────────────┐   │
│   │ 213 CAPTURE A PLURALITY OF COMPONENTS INCLUDING VISIBLE AND     │   │
│   │ NON VISIBLE COMPONENTS ASSOCIATED WITH THE AT LEAST ONE WEB     │   │
│   │ PAGE                                                            │   │
│   │   ┌─────────────────────────────────────────────────────────┐   │   │
│   │   │ 214 TRAVERSE THE AT LEAST ONE WEB PAGE TO IDENTIFY EACH │   │   │
│   │   │ OF THE COMPONENTS WITHIN THE PLURALITY OF COMPONENTS    │   │   │
│   │   │ ON THE AT LEAST ONE WEB PAGE                            │   │   │
│   │   └─────────────────────────────────────────────────────────┘   │
│   │                               ▼                                 │   │
│   │   ┌─────────────────────────────────────────────────────────┐   │   │
│   │   │ 215 LOCALLY STORE A COPY OF EACH OF THE COMPONENTS      │   │   │
│   │   │ WITHIN THE PLURALITY OF COMPONENTS                      │   │   │
│   │   └─────────────────────────────────────────────────────────┘   │   │
│   └─────────────────────────────────────────────────────────────────┘   │
└─────────────────────────────────────────────────────────────────────────┘
```

*FIG. 12*

216 TRAVERSE THE AT LEAST ONE WEB PAGE TO IDENTIFY EACH OF THE COMPONENTS WITHIN THE PLURALITY OF COMPONENTS ON THE AT LEAST ONE WEB PAGE

217 IDENTIFY AT LEAST ONE COMPONENT IN THE PLURALITY OF COMPONENTS AS A REFERENCE TO A REMOTELY LOCATED OBJECT

218 STORE A COPY OF THE REMOTELY LOCATED OBJECT LOCALLY SUCH THAT THE COPY OF THE REMOTELY LOCATED OBJECT IS A LOCALLY STORED OBJECT

219 MODIFY THE REFERENCE TO THE REMOTELY LOCATED OBJECT TO REFERENCE THE LOCALLY STORED OBJECT

OR

220 IDENTIFY AT LEAST ONE COMPONENT IN THE PLURALITY OF COMPONENTS AS A STYLE

221 IDENTIFY THAT A SET OF INSTRUCTIONS DEFINING THE STYLE RESIDES SEPARATELY FROM THE PLURALITY OF COMPONENTS ON THE WEB PAGE

222 CAPTURE A COPY OF THE SET OF INSTRUCTIONS DEFINING THE STYLE

*FIG. 13*

```
┌─────────────────────────────────────────────────────────────────────┐
│ 223 TRAVERSE THE AT LEAST ONE WEB PAGE TO IDENTIFY EACH OF THE      │
│ COMPONENTS WITHIN THE PLURALITY OF COMPONENTS ON THE AT LEAST ONE   │
│ WEB PAGE                                                            │
│                                                                     │
│   ┌─────────────────────────────────────────────────────────────┐   │
│   │ 224 IDENTIFY AT LEAST ONE COMPONENT IN THE PLURALITY OF     │   │
│   │ COMPONENTS AS A DATA FIELD FOR RECEIVING INPUT FROM A USER  │   │
│   │                                                             │   │
│   │   ┌─────────────────────────────────────────────────────┐   │   │
│   │   │ 225 IDENTIFY THE DATA FIELD CONTAINS INPUT          │   │   │
│   │   └─────────────────────────────────────────────────────┘   │   │
│   │                            │                                │   │
│   │                            ▼                                │   │
│   │   ┌─────────────────────────────────────────────────────┐   │   │
│   │   │ 226 CAPTURE THE DATA FIELD CONTAINING THE INPUT     │   │   │
│   │   └─────────────────────────────────────────────────────┘   │   │
│   └─────────────────────────────────────────────────────────────┘   │
└─────────────────────────────────────────────────────────────────────┘
```

*FIG. 14*

227 PACKAGE THE CONTENT OF THE AT LEAST ONE WEB PAGE INTO A CONTAINER CAPABLE OF BEING RENDERED, SUCH THAT THE CONTAINER PROVIDES A PLURALITY OF COMPONENTS ASSOCIATED WITH THE AT LEAST ONE CAPTURED WEB PAGE

228 ARCHIVE A PLURALITY OF WEB PAGES IN THE CONTAINER

229 CREATE A CONTAINER REFERENCE TO THE CONTAINER

230 TRANSMIT NOTIFICATION OF THE CONTAINER REFERENCE

231 QUEUE THE CONTAINER REFERENCE FOR DELIVERY OF THE CONTAINER

*FIG. 15*

234 RENDER THE CONTAINER TO DISPLAY CONTENT OF THE AT LEAST ONE CAPTURED WEB PAGE

235 RENDER THE CONTENT OF THE AT LEAST ONE CAPTURED WEB PAGE TO INCLUDE AT LEAST ONE OF:
i) A SCREEN CAPTURE INFORMATION REGION
ii) A SCREEN SHOT IDENTIFICATION REGION
iii) A WEB PAGE DETAIL REGION 236 RENDER THE SCREEN CAPTURE INFORMATION REGION TO INCLUDE AT LEAST ONE OF:
i) A SCRIPT IDENTIFIER IDENTIFYING A SCRIPT THAT INVOKES THE AT LEAST ONE TRANSACTION TO MONITOR THE AT LEAST ONE CAPTURED WEB PAGE
ii) A TIMESTAMP ASSOCIATED WITH THE SCRIPT
iii) AN SERVER IDENTIFIER IDENTIFYING A SERVER ON WHICH THE SCRIPT IS EXECUTING
iv) AN ERROR CODE ASSOCIATED WITH THE SCRIPT
v) AN ERROR NAME ASSOCIATED WITH THE SCRIPT
vi) AN OPTION TO DISPLAY THE CONTENTS OF THE CONTAINER

*FIG. 17*

237 RENDER THE CONTAINER TO DISPLAY CONTENT OF THE AT LEAST ONE CAPTURED WEB PAGE

238 RENDER AT LEAST ONE WEB PAGE IDENTIFIER IDENTIFYING THE AT LEAST ONE CAPTURED WEB PAGE CONTAINED WITHIN THE CONTAINER

239 RENDER THE AT LEAST ONE WEB PAGE IDENTIFIER TO IDENTIFY AT LEAST ONE OF:
i) A WEB PAGE SUCCESSFULLY EXECUTED BY A SCRIPT
ii) A WEB PAGE UNSUCCESSFULLY EXECUTED BY THE SCRIPT
iii) A WEB PAGE NOT EXECUTED BY THE SCRIPT

OR

240 RENDER THE WEB PAGE DETAIL REGION TO INCLUDE AT LEAST ONE OF:
i) A SCREEN SHOT OF THE LEAST ONE CAPTURED WEB PAGE
ii) A SOURCE CODE LISTING OF THE LEAST ONE CAPTURED WEB PAGE
iii) AT LEAST ONE HEADER ASSOCIATED WITH THE LEAST ONE CAPTURED WEB PAGE
iv) A TRACE ROUTE ASSOCIATED WITH THE LEAST ONE CAPTURED WEB PAGE 241 RENDER THE SCREEN SHOT OF THE LEAST ONE CAPTURED WEB PAGE DISPLAYED AT THE TIME AN ERROR OCCURRED, THE ERROR ASSOCIATED WITH A SCRIPT INVOKING THE AT LEAST ONE TRANSACTION

FIG. 18

METHODS AND APPARATUS FOR COLLECTING AND DISPLAYING PERFORMANCE METRICS FROM A WEB SITE

CROSS REFERENCE TO RELATED APPLICATIONS

This Patent application is a Continuation-in-Part of U.S. patent application Ser. No. 11/223,264 filed on Sep. 9, 2005, entitled, "METHODS AND APPARATUS FOR COLLECTING PERFORMANCE METRICS FROM A WEB SITE" which is a Continuation-in-Part of U.S. patent application Ser. No. 11/094,338 filed on Mar. 30, 2005 now abandoned, entitled, "METHOD AND APPARATUS FOR MEASURING AND REPORTING LOADING SPEED OF INFORMATION OVER COMPUTER NETWORKS" which claims benefit of U.S. Provisional Application No. 60/557,994 filed on Mar. 31, 2004, entitled, "METHOD AND APPARATUS FOR MEASURING AND REPORTING LOADING SPEED OF INFORMATION OVER COMPUTER NETWORKS" and U.S. Provisional Application No. 60/592,813 filed on Jul. 30, 2004, entitled, "SCRIPTABLE TRANSACTION AGENT". The contents and teachings of each of these hereby incorporated by reference in their entirety.

BACKGROUND

Computer systems coupled to a data communications network, such as the Internet, allow for the exchange of a wide variety of information between users of such computer systems. One popular use of computer networks, such as the Internet, allows users to operate client communications software, known as a web browser, to communicate with remote computer systems, known as web servers, in order to browse web pages on the World Wide Web. The World Wide Web is generally a collection of web server computer systems that each operates web server software that communicates using a number of different data communications protocols and data formats, to allow each user's browser to make web page requests to the web servers. In response to these web page requests, web servers obtain (e.g., from storage, or via dynamic generation) the requested web pages and serve those pages back to each user's web browser for viewing by the user.

A typical web page is written in a markup language, such as the Hypertext Markup Language (HTML), and includes a number of embedded objects referenced by respective Uniform Resource Locators (URLs) within the HTML of a web page. The web page itself is generally referenced by a URL, as well. When a user provides a URL to a web browser of a web page (either by clicking a hyperlink identifying the URL to that web page, or by typing in the URL of the web page), the web browser performs a detailed sequence of processing tasks to obtain that web page. As an example, if the URL of the web page identifies a domain name of a server computer system on the Internet, the web browser must first perform a Domain Name Service (DNS) lookup of the domain name to resolve this alphanumeric name into the Internet Protocol (IP) address of the web server on the Internet that can serve the page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URL's that define other objects within the web page to be obtained by web browser. As an example, a graphic or image embedded within the web page is typically referenced with an embedded URL that specifies a server, and location (e.g. filename and directory path) within the server of that graphic or image. As the web browser encounters objects such as embedded URL's within the web page, the web browser repeats the sequence of processing described above the URL for the web page in order to obtain each embedded object, this can include performing a DNS lookup of the domain name specified in the URL (if that domain name was not previously resolved), establishing a connection to a server, and initiating an HTTP get request to obtain the content associated with the embedded URL. Modern web pages often contain many embedded objects, and URLs, that reference these objects, often specify different server computer systems from which to obtain these objects. As a result, the process of obtaining the complete content associated with a single web page including all embedded objects involves significant processing and communications activities.

Sophisticated web server software systems allow a user to visit the web site using his or her browser in order to perform transactions within the web site such as purchasing goods or services. Performance of the transaction with a web site typically involves the user operating the web browser to initially navigate to the homepage of the commercial web site. From the homepage, the user is able to further navigate to other pages associated with the web site in order to perform the transaction, such as, for example, selecting goods or services to be placed into an electronic or virtual shopping cart maintained within the web server as the user moves form page to page of the transaction. When the user has completed the selection of goods and services to be purchased, the user can further navigate within the web site to one or more purchasing web pages that allow the user, for example, to enter credit card information for payment of the selected goods and services. The web server software is able to process the credit card payment and allow or deny the purchase of the selected goods and services to complete the transaction. A single transaction might involve visiting and providing user input to a sequence of many web pages.

Other types of transactions might involve navigating through a sequence of web pages to obtain desired content, performing searches for user specified information, and so forth. Depending upon the purpose of the web site, a typical user transaction can involve a user visiting a number of pages and providing user input on those pages. The web server often uses input from one or more pages to produce successive web pages in a given transaction.

Many organizations such as corporations, universities and web-based businesses rely heavily on the ability of their web site to properly perform transactions without errors. Because of the importance of ensuring that such web sites are operating properly, software developers have produced a number of conventional tools to exercise and test a web site and measure the performance of that web site's ability to process user transactions correctly and efficiently.

One conventional web site testing and performance measurement tool is a first generation web site testing tool, and is also referred to herein as a single web page test tool. A first generation single web page test tool allows an operator of the tool to provide a single URL of a single web page to the tool.

In response to receiving this URL, the tool is able to initiate a web page request for the web page located at the URL, and is able to measure and collect certain performance ratings of the web site with respect to how fast the web server returns the web page in response to initiating the request for the web page using the URL. As an example, one conventional performance measurement tool is able to initiate a request for a web page and track the amount of time required to establish a connection to the web server that serves that web page. Additionally, the conventional first generation single page test tool is able to determine the amount of time required to begin receiving data for the web page, and the amount of time required for the entire web page to be delivered back to the test tool. Additionally, the conventional test tool is able to parse hypertext markup language (HTML) to determine if the web page was properly returned from the web server.

More sophisticated second generation web server performance and testing tools provide the ability to specify a sequence of web pages to be obtained from a web site. Such conventional web testing tools are referred to as second generation web testing tools and operate by wrapping an actual web browser with a software program to essentially remotely control the web browser using software application programming interfaces (APIs) to cause the browser under control of the test tool to visit sequence of pages to perform a transaction with web server.

SUMMARY

Conventional technologies for measuring and testing the performance of transactions on web sites suffer from a variety of deficiencies. In particular, while conventional second generation web testing tools offer the ability to remotely control browser software to perform an entire transaction associated with web site, the granularity or amount of detail that can be obtained concerning the performance of the web site by such second generation tools is significantly lacking on a page by page basis in comparison to the first generation single page web testing tools. In the background above, it was noted that first generation single page web testing tools are capable of collecting detailed performance ratings for a single web page. The reason the first generation single page web test tools are able to do this is because the test tool is specifically written to measure the timing metrics for that single individual page. Such conventional single page tools are not readily adaptable to collecting such metrics for entire sequences of pages involved in a complex transaction with a sophisticated web site. This is because the single page web test tools do not fully emulate a web browser and are not fully capable of maintaining web browser state information such as cookies or other data that are often required and exchanged between a browser and server when carrying out a multi-page web server based transaction.

While the second generation web testing tools can control an actual browser to perform transactions, the amount and granularity or detail of data that is available using available software application programming interfaces (APIs) that control the browser limits the amount of details concerning the performance of a web transaction on a page by page and object by object basis. This is because the APIs available to off-the-shelf browsers only allow a secondary application to obtain limited data concerning what processing is happening within the browser as the browser retrieves web pages and interacts with a server or other computer systems on a network such as the Internet. As an example, using conventional web testing and performance measurement tools, there is no way to query a conventional web browser using browser provided APIs to inquire as to the amount of time required to obtain the first byte of data from a web server for a particular web page requested with a URL. Likewise, no data is available from a wrapper driven browser concerning detailed metrics for each object in that page. Accordingly, though the second generation web testing tools can indicate whether or not a transaction was able to be successfully completed with a web site as a whole (i.e., that all pages were obtained), such tools lack the ability to provide or acquire or track detailed performance metrics concerning individual pages or objects loaded during the transaction.

Embodiments disclosed herein significantly overcome these and other deficiencies associated with conventional web site testing and performance measurement systems and provide an agent, such as a software process, that executes remotely from a web site and is operable to measure performance and operability of the web site. The agent obtains a script that contains transactions to perform on a web site. The script executes, and requests web pages on the web site. The agent obtains the performance metrics upon occurrence of a capture event, such as an error on the web page. The capture event can be a threshold specified by a user, or it can be a web page error, such as a 'page not found' server error, network error, object error, or other error. In response to the capture event, the agent captures the content of the web page on which the error occurred, and packages the content of the page produced in response to the capture event into a container. The container can be transferred to a remote analysis site such that the captured web page can be rendered locally (i.e. locally with respect to a computer system performing analysis of the error). Copies of all remote objects referenced by the captured web page are captured locally such that all references on the web page that originally pointed to remotely located objects now point to local objects. The agent can deliver or transfer the container to a repository for later analysis.

Embodiments disclosed herein also provide a performance displaying process that receives the container from the agent. The performance displaying process stores the container, and displays the content of the captured web page within a graphical user interface. The performance displaying process provides information about the captured web page such as a test within the script on which the capture event occurred, the test time at which the capture event occurred, a server on which the agent was executing when the capture event occurred, an error code associated with the capture event, and an error name associated with the capture event. Other data can be provided as well. The performance displaying process also provides details related to the transaction performed on the web site by the script. As the script executes, various transactions are performed on the web site, such as requesting a sequence of web pages. The performance displaying process provides a representation of the web pages requested by the script, including information regarding which web page were successfully executed, which web pages had errors, and which web pages were not accessed during the execution of the script. The performance displaying process also provides screen shots of the web pages requested by the script, including unaltered source code, HTTP headers, and trace route information.

Embodiments disclosed herein include a computer system executing an agent process. The agent obtains a script containing at least one transaction to be performed with the web site. The transaction defines a sequence of page requests identifying at least one web page to obtain from the web site. The agent executes the script to perform the transaction with the web site. Performance of the transaction includes retrieving the sequence of the web page. The agent detects a capture event associated with the web page. In response to the capture event, the agent captures content of the web page, and packages the content of the web page into a container capable of being rendered, such that the container provides a plurality of components associated with the captured web page. The agent then delivers the container to a repository.

Embodiments disclosed herein also include a computer system executing a performance displaying process that receives a container from the agent. The container contains at least one captured web page associated with a web site. The captured web page contains a plurality of components, and is a result of at least one transaction executed on the web site by the agent. The performance displaying process stores the container, and renders the container to display the content of the captured web page.

During an example operation of one embodiment, suppose an agent obtains a script to perform a series of transactions on a web site, such as an online banking web site. The series of transactions include logging onto the online banking website, opening a business bank account, and depositing a minimum amount of money necessary to establish the business bank account. The script has been pre-configured to detect a capture event when the "virtual user" fails to open the bank account due to an error returned by the website The agent executes the script, and the script begins to execute the sequence of transactions on the online banking website. When the script executes the transaction of attempting to open the business bank account and is denied by the server, the capture event is triggered. The agent detects the capture event has occurred, and in response, captures the content of the web page on which the capture event occurred. The agent packages the content of the web page into a container that is capable of being fully rendered locally. The agent then delivers the container to a repository.

The performance displaying process receives the container from the agent, stores the container and renders the contents of the web page on which the capture event occurred. The performance displaying process displays name of the online banking transaction script, the time at which the capture event occurred, the server from which the online banking transaction script was executing, an error code associating with the online banking transaction, and an error name associated with the online banking transaction. The performance displaying process also displays identifiers identifying each of the pages in the online banking transaction. Those pages that were successfully executed are displayed, for example, with green identifiers signifying a successfully executed web page. Those pages that were not successfully executed (i.e., the page on which the attempt to open an online bank account with a balance below the required minimum) are displayed, for example, with red identifiers signifying an unsuccessfully executed web page. Those pages that were not executed (for example, the script detected a capture event, and stopped such that the remaining web pages were not executed) are displayed, for example, with white identifiers signifying a web page that was not executed. The performance displaying process also displays a screen shot of the web page on which the capture event occurred, the source code of that web page, HTTP headers associated with that web page and trace route information associated with a host that hosts that web page.

Other embodiments disclosed herein include any type of computerized device, workstation, handheld or laptop computer, or the like configured with software and/or circuitry (e.g., a processor) to process any or all of the agent operations disclosed herein. In other words, a computerized device or a processor that is programmed or configured to operate in accordance with the system as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a communications interface, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system disclosed herein can be embodied strictly as a software program, as software and hardware, or as hardware alone such as within a processor, or within an operating system or a within a software application and that the agent can execute in any type of computer system. Example embodiments disclosed herein may be implemented within products and/or software applications manufactured by Gomez, Inc. of Lexington, Mass., USA.

BRIEF DESCRIPTION OF THE DRAWINGS

The foregoing and other objects, features and advantages disclosed herein will be apparent from the following more particular description of embodiments disclosed herein, as illustrated in the accompanying drawings and figures in which like reference characters refer to the same parts throughout the different views. The drawings are not necessarily to scale, with emphasis instead being placed upon illustrating the embodiments, principles and concepts disclosed herein.

FIG. 11 illustrates a flowchart of a procedure performed by the system of FIG. 1 when the agent process captures content of the web page, and identifies a capture event in a script, according to one embodiment disclosed herein.

FIG. 12 illustrates a flowchart of a procedure performed by the system of FIG. 1 when the agent process captures content of the web page, according to one embodiment disclosed herein.

FIG. 13 illustrates a flowchart of a procedure performed by the system of FIG. 1 when the agent process traverses the web page to identify each of the components within the plurality of components on the web page, according to one embodiment disclosed herein.

FIG. 14 illustrates a flowchart of a procedure performed by the system of FIG. 1 when the agent process traverses the web page to identify each of the components within the plurality of components on the web page, and identifies at least one component in the plurality of components as a data field for receiving input from a user, according to one embodiment disclosed herein.

FIG. 15 illustrates a flowchart of a procedure performed by the system of FIG. 1 when the agent process packages the content of the web page into a container capable of being rendered locally, according to one embodiment disclosed herein.

FIG. 17 illustrates a flowchart of a procedure performed by the system of FIG. 2 when the performance displaying process renders the container to display content of the captured web page including at least one of a screen capture information region, a screen shot identification region, and a web page detail region, according to one embodiment disclosed herein.

FIG. 18 illustrates a flowchart of a procedure performed by the system of FIG. 2 when the performance displaying process renders the container to display content of the captured web page, according to one embodiment disclosed herein.

DETAILED DESCRIPTION

Figure 1:
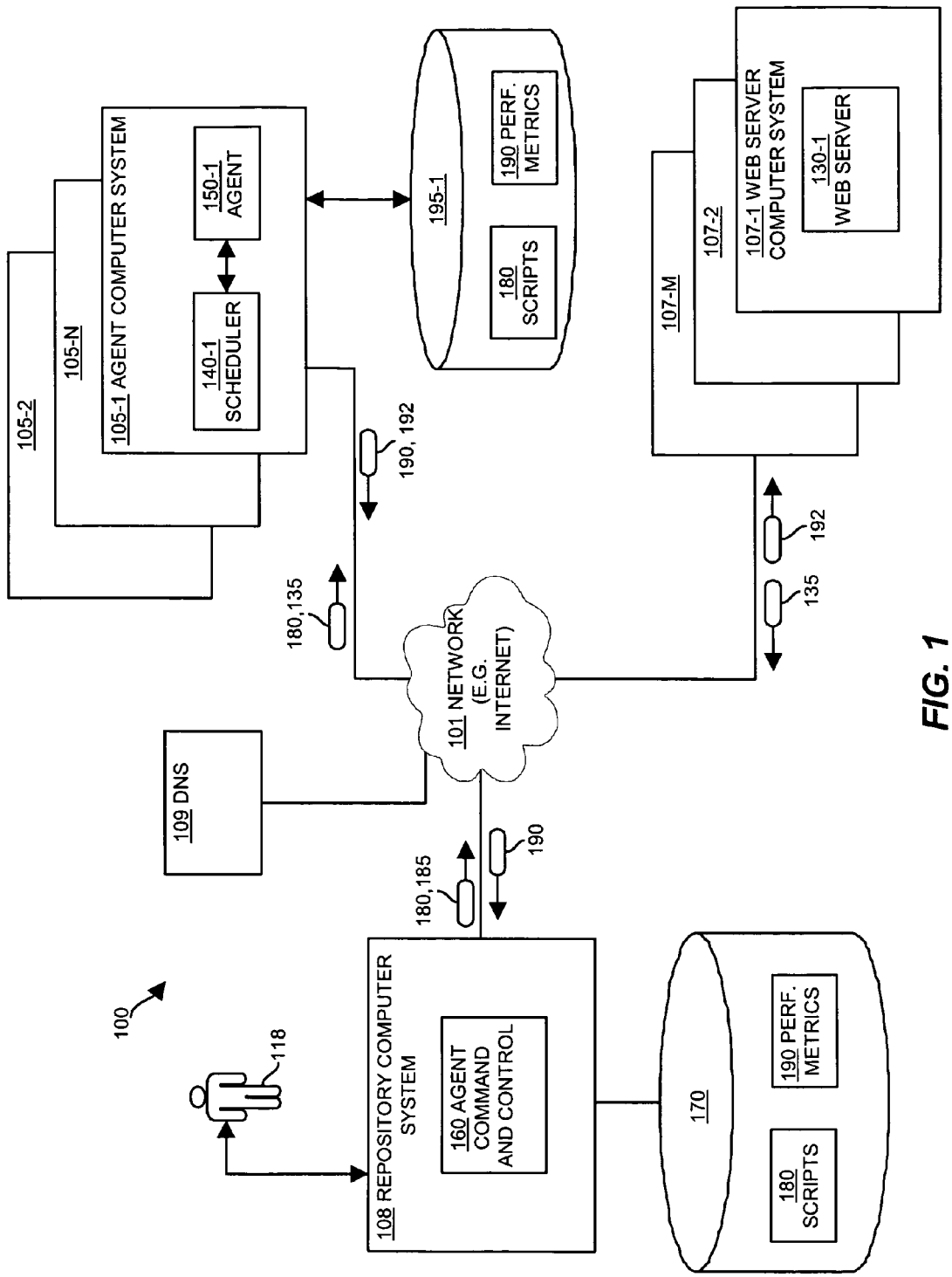
FIG. 1 is a block diagram of an example network environment that operates agents configured in accordance with embodiments disclosed herein.

Embodiments disclosed herein provide an agent, such as a software process, that executes remotely from a web site and is operable to measure performance and operability of the web site. The agent obtains a script that contains transactions to perform on a web site. The script executes, and requests web pages on the web site. The agent obtains the performance metrics upon occurrence of a capture event, such as an error on the web page. The capture event can be a threshold specified by a user, or it can be a web page error, such as a 'page not found' server error. In response to the capture event, the agent captures the content of the web page on which the error occurred, and packages the content into a container such that the captured web page can be rendered locally. Copies of all remote objects referenced by the captured web page are captured locally such that all references on the web page that originally pointed to remotely located objects now point to local object. The agent then delivers the container to a repository.

Embodiments disclosed herein provide a performance displaying process that receives the container from the agent. The performance displaying process stores the container and displays the content of the captured web page within a graphical user interface. The performance displaying process provides information about the captured web page such as a test within the script on which the capture event occurred, the test time at which the capture event occurred, a server on which the agent was executing when the capture event occurred, an error code associated with the capture event, and an error name associated with the capture event. The performance displaying process also provides details related to the transaction performed on the web site by the script. As the script executes, various transactions are performed on the web site such as requesting a sequence of web pages. The performance displaying process provides a representation of the web pages requested by the script, including information regarding which web page were successfully executed, which web pages had errors and which web pages were not accessed during the execution of the script. The performance displaying process also provides screen shots of the web pages requested by the script, including unaltered source code, HTTP headers, and trace route information.

Embodiments disclosed herein include a computer system executing an agent process. The agent obtains a script containing at least one transaction to be performed with the web site. The transaction defines a sequence of page requests identifying at least one web page to obtain from the web site. The agent executes the script to perform the transaction with the web site. Performance of the transaction includes retrieving the sequence of the web page. The agent detects a capture event associated with the web page. In response to the capture event, the agent captures content of the web page, and packages the content of the web page into a container capable of being rendered, such that the container provides a plurality of components associated with the captured web page. The agent then delivers the container to a repository.

Embodiments disclosed herein also include a computer system executing a performance displaying process that receives a container from the agent. The container contains at least one captured web page associated with a web site. The captured web page contains a plurality of components, and is a result of at least one transaction executed on the web site by the agent. The performance displaying process stores the container, and renders the container to display the content of the captured web page.

FIG. 1 illustrates a computer network environment 100 suitable for use in explaining example embodiments disclosed herein. The computer network environment 100 includes a computer network 101, such as the Internet, that couples a plurality of agent computer systems 105-1 through 105-N to a plurality of web server computer systems 107-1 through 107-M. The agent computer systems 105 each operate a respective scheduler 140 (there may be more than one) and one or more agents 150. The web server computer systems 107 each operate a respective web server 130. The agents 150 and web servers 130 may be software applications that execute on the respective computer systems 105 and 107. The network 101 also couples a repository computer system 108 that operates an agent command and control process 160 under guidance of an operator 118. The agent command and control process 160 maintains a repository 170 such as a database that stores scripts 180 to be executed by the agents 150 and performance metric data 190. The network 101 also includes one or more domain name server computer systems 109 to operate according to the DNS protocol. The agent computer systems 105 may be located across a broad geographic area such as throughout the United States or throughout the entire world. This scheduler 140 and agents 150 operate as autonomous software processes on the agent computer systems 105 and can be remotely controlled by the agent command and control process 160 as explained herein.

As noted in the summary above, the agents 150 are operable to obtain one or more scripts 180 from the agent command and control process 160. Each script defines one or more transactions that may be performed with one or more of the web servers 130 operating in the web server computer systems 107. As a brief example, the web servers 130 may be commercial web servers operated by business organizations that sell goods or services on the Internet. The business organizations may pay a fee to have a script 180 developed by the operator (e.g., the assignee of embodiments disclosed herein) to perform various transactions with the web servers 130, such as accessing a web page 135. The agent 150 issues a request 192 (e.g., an HTTP GET request) for the web page 135 to be served from the web site using the uniform resource locator specified in a page request. Once the operator 118 has created a script 180 and that encapsulated information associated with performance of the transaction with the web server 130, the agent command and control process 160 can propagate and script to the agent computer systems 105 for receipt by the scheduler 140. The scheduler 140 receives the script 180, and places in any script database that is local to the agent computer system 105. The scheduler 140 also receives scheduling information 185 from the agent command and control process 160 that indicates how frequently scheduler 140 should activate or execute the script 180 within an agent 150. In one configuration scheduling information 185 may be embedded within the script 180.

Upon occurrence of the time to execute the script 180, the scheduler 140 provides the script 180 from the script database 195 to the agent 150 for execution. The agent 150 is able to execute the transaction(s) defined within the script 180 in conjunction with the web server 130 to perform the scripted transaction on the web site of the business organization. During performance of the transaction, the agent 150 is able to collect detailed performance metrics 190 concerning all aspects performance of the transaction with respect each web page involved in the transaction.

The traffic flow tracking process 170 may be embodied as software code such as data and/or logic instructions (e.g., code stored in the memory or on another computer readable medium such as a removable disk) that supports processing functionality according to different embodiments described herein.

It is noted that example configurations disclosed herein include the traffic flow tracking process 170 itself (i.e., in the form of un-executed or non-performing logic instructions and/or data). The traffic flow tracking process 170 may be stored as an application on a computer readable medium (such as a floppy disk), hard disk, electronic, magnetic, optical, or other computer readable medium. The traffic flow tracking process 170 may also be stored in a memory system such as in firmware, read only memory (ROM), or, as in this example, as executable code in, for example, Random Access Memory (RAM). Those skilled in the art will understand that the first router 110, the second router 120 and a collector 160 may include other processes and/or software and hardware components, such as an operating system not shown in this example.

Figure 2:
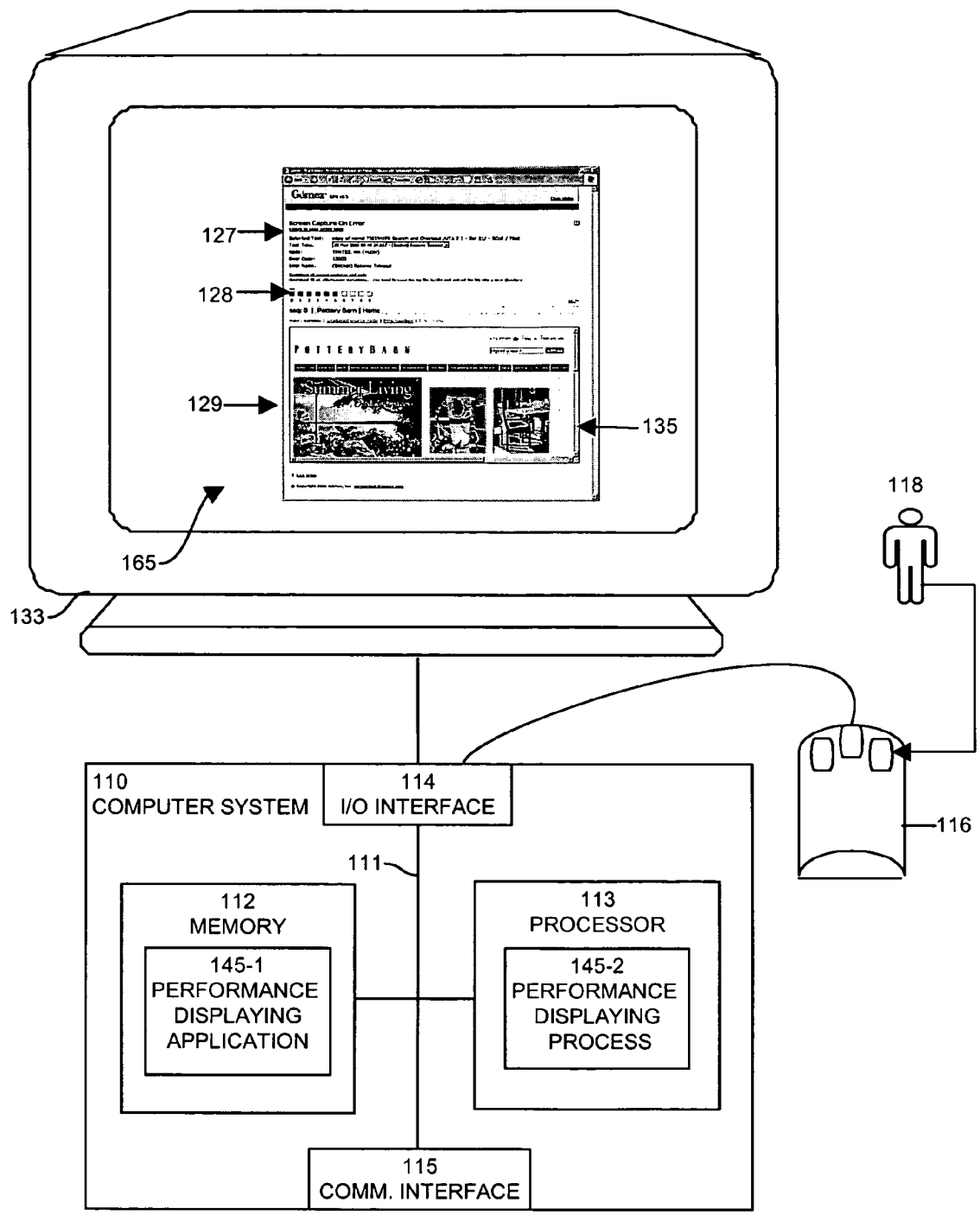
FIG. 2 shows a high-level block diagram of a computer system according to one embodiment disclosed herein.

FIG. 2 is a block diagram illustrating example architecture of a computer system 110 that executes, runs, interprets, operates or otherwise performs a performance displaying application 145-1 and process 145-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 118 to provide input commands and generally control the graphical user interface 165 that the performance displaying application 145-1 and process 145-2 provides on the display 133. The graphical user interface 165 displays the content of the captured web page 135 including the screen capture information region 127, screen capture identification region 128 and web page detail region 129. The communications interface 115 enables the computer system 110 to communicate with other devices (i.e., other computers) on a network (not shown). This can allow access to the performance displaying application by remote computer systems and, in some embodiments, the contents of the container can be obtained from a remote source via the communications interface 115.

The memory system 112 is any type of computer readable medium and, in this example, is encoded with a performance displaying application 145-1. The performance displaying application 145-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112, via the interconnect 111, in order to launch, run, execute, interpret or otherwise perform the logic instructions of the performance displaying application 145-1. Execution of performance displaying application 145-1 in this manner produces processing functionality in a performance displaying process 145-2. In other words, the performance displaying process 145-2 represents one or more portions of runtime instances of the performance displaying application 145-1 (or the entire application 145-1) performing or executing within or upon the processor 113 in the computerized device 110 at runtime.

It is noted that example configurations disclosed herein include the performance displaying application 145-1. The performance displaying application 145-1 may be stored on a computer readable medium (such as a floppy disk), hard disk, electronic, magnetic, and optical or other computer readable medium. The performance displaying application 145-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the performance displaying application 145-1 in the processor 113 as the performance displaying process 145-2. Those skilled in the art will understand that the computer system 110 may include other processes and/or software and hardware components, such as an operating system not shown in this example.

A display 133 need not be coupled directly to computer system 110. For example, the performance displaying application 145-1 can be executed on a remotely accessible computerized device via the network interface 115. In this instance, the graphical user interface 165 may be displayed locally to a user of the remote computer and execution of the processing herein may be client-server based.

Figure 3:
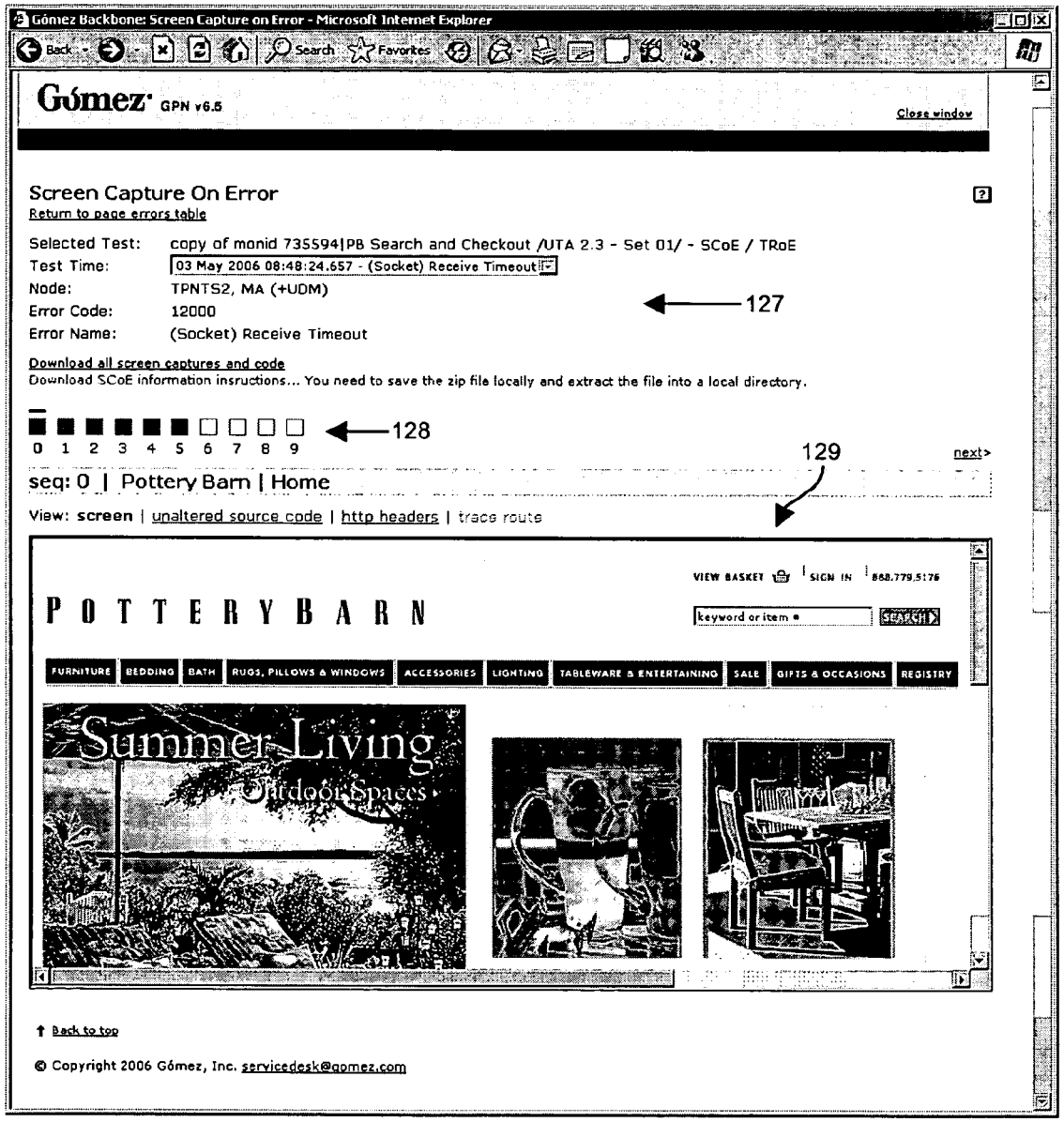
FIG. 3 is a screen shot of the contents of a container, the screen shot depicting a display of a successfully executed web page, according to one embodiment disclosed herein.

FIG. 3 is a screen shot of the contents of a container received from the agent 150 by the performance displaying process 145-2. The screen shot depicts a display of a successfully executed web page 135. The screen shot includes a screen capture information region 127, a screen shot identification region 128 and a web page detail region 129.

Figure 4:
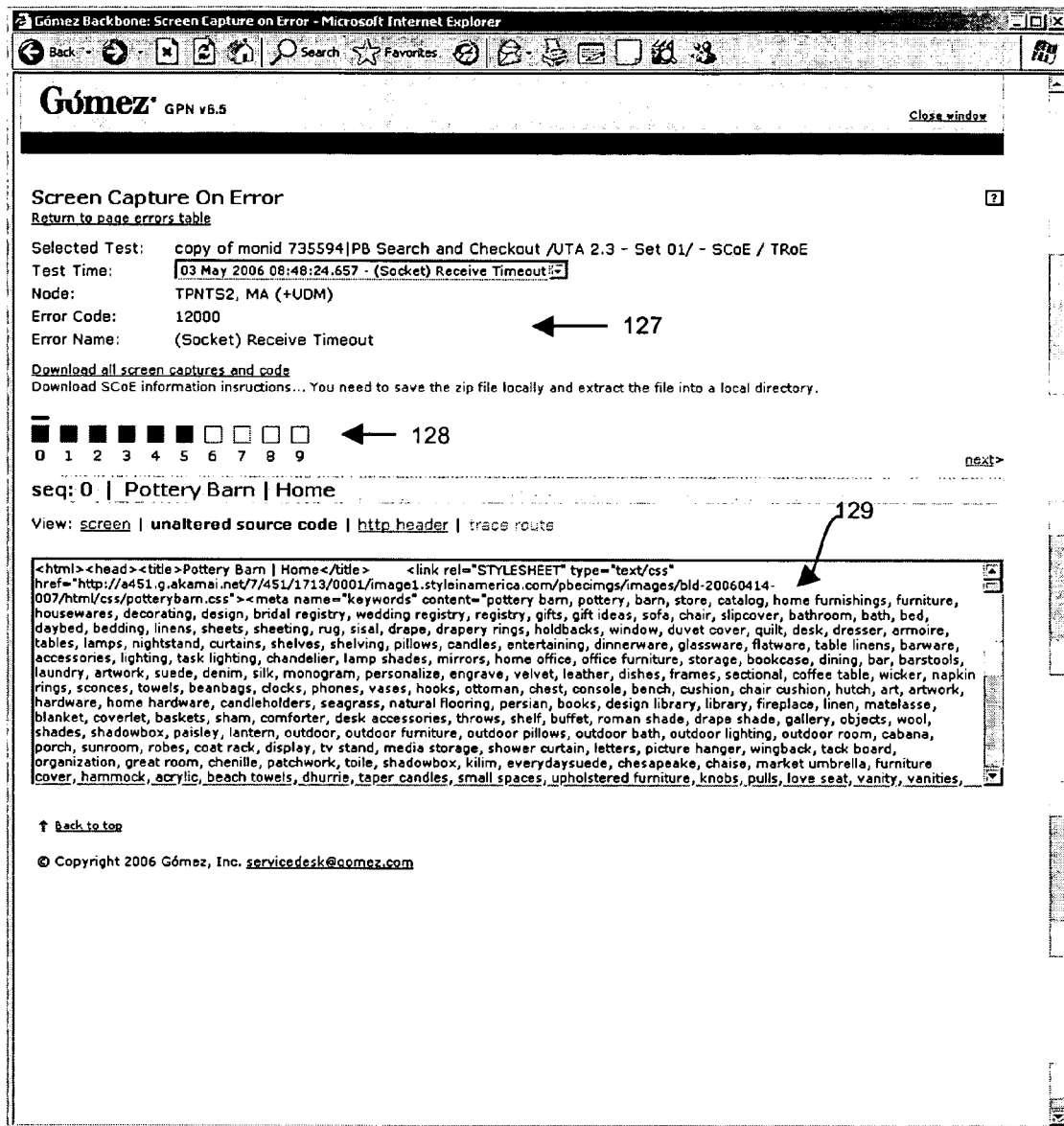
FIG. 4 is a screen shot of the contents of a container, the screen shot depicting a display of source code of a successfully executed web page, according to one embodiment disclosed herein.

FIG. 4 is a screen shot of the contents of a container received from the agent 150 by the performance displaying process 145-2. The screen shot depicts a display of source code of a successfully executed web page 135. The screen shot includes a screen capture information region 127, a screen capture identification region 128 and a web pate detail region 129.

Figure 5:
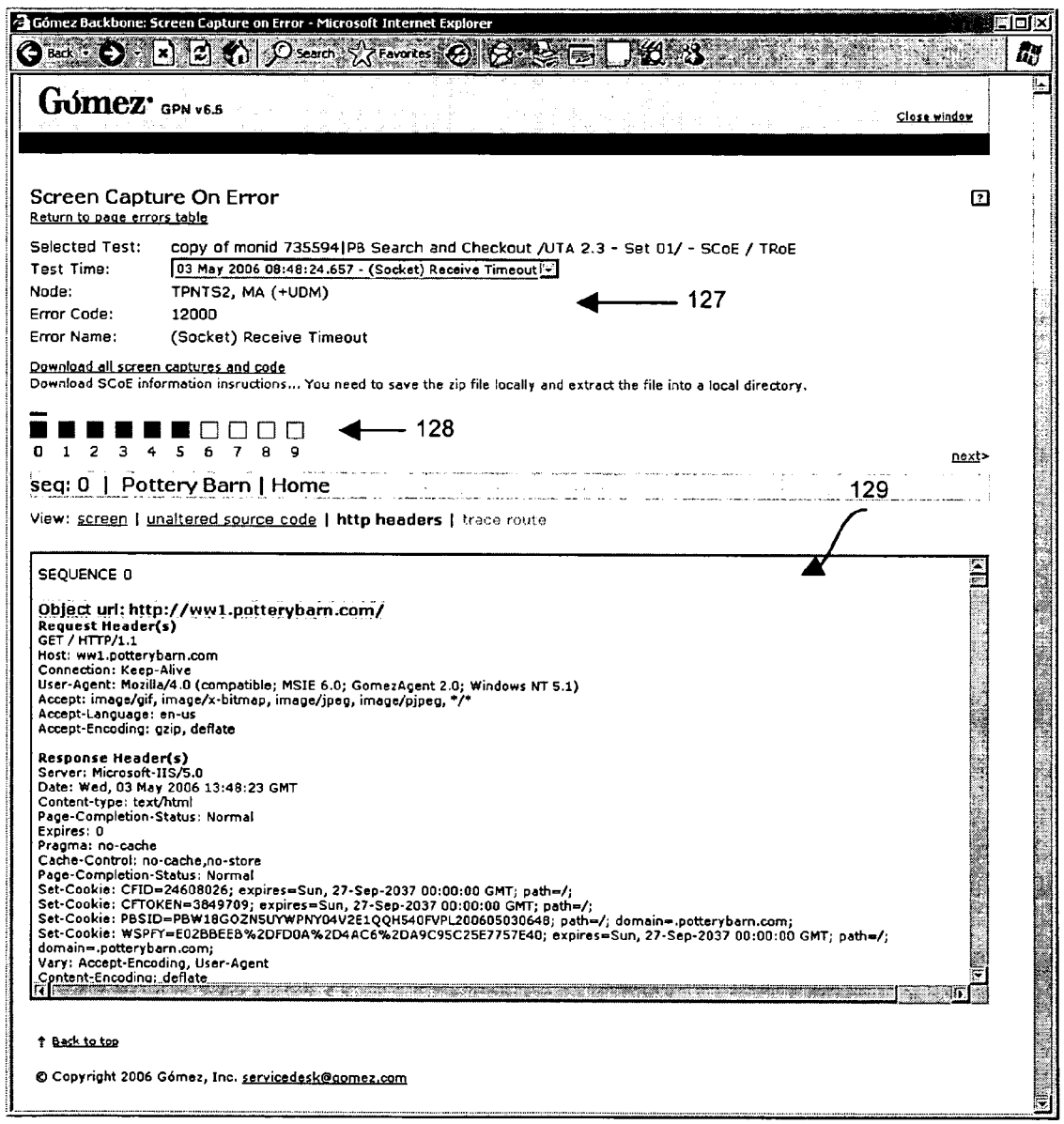
FIG. 5 is a screen shot of the contents of a container, the screen shot depicting a display of HTTP headers of a successfully executed web page, according to one embodiment disclosed herein.

FIG. 5 is a screen shot of the contents of a container received from the agent 150 by the performance displaying process 145-2. The screen shot depicts a display of HTTP headers of a successfully executed web page 135. The screen shot includes a screen capture information region 127, a screen capture identification region 128 and a web pate detail region 129.

Figure 6:
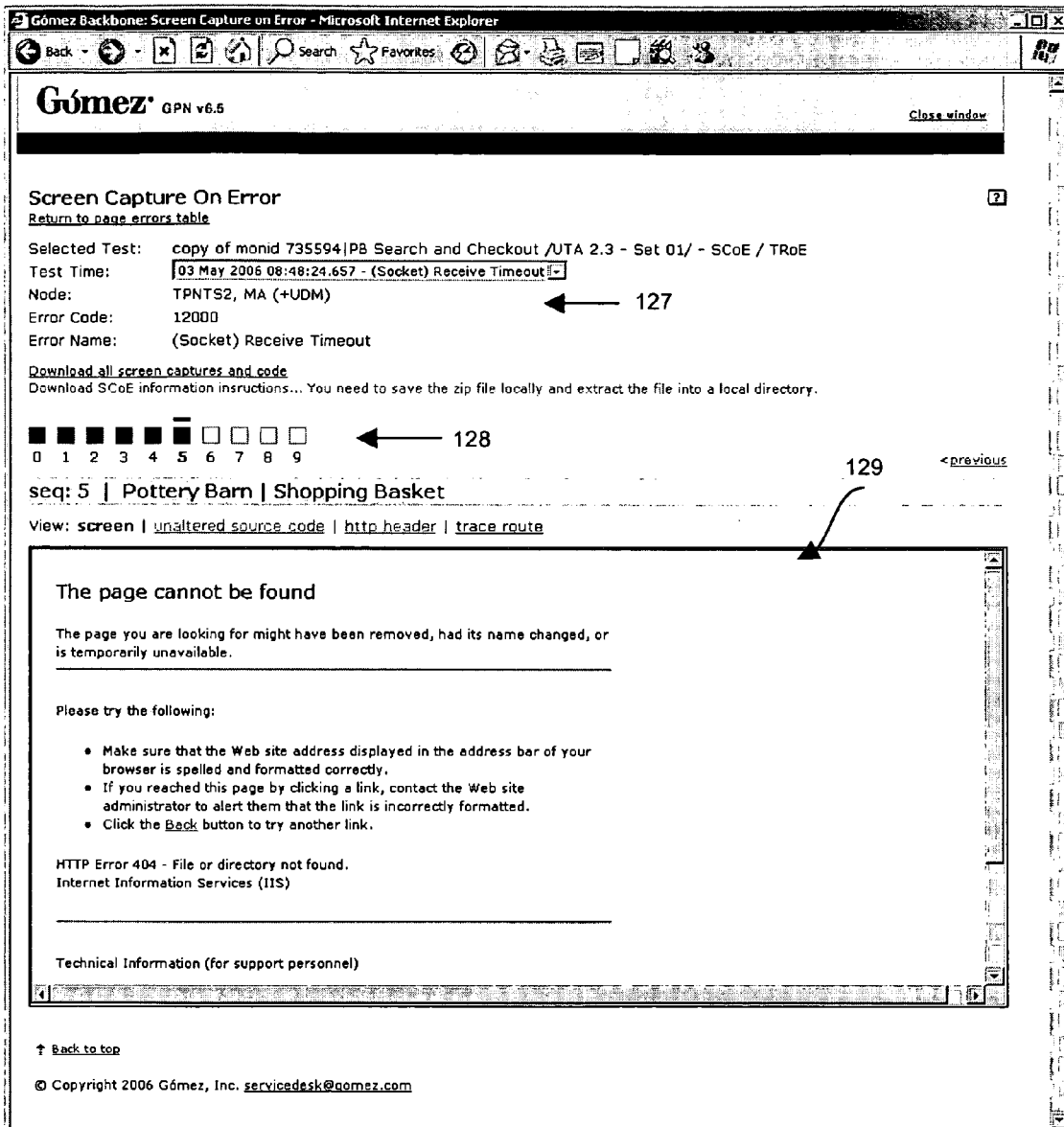
FIG. 6 is a screen shot of the contents of a container, the screen shot depicting a display of an unsuccessfully executed web page, according to one embodiment disclosed herein.

FIG. 6 is a screen shot of the contents of a container received from the agent 150 by the performance displaying process 145-2. The screen shot depicts a display of an unsuccessfully executed web page 135. The screen shot includes a screen capture information region 127, a screen capture identification region 128 and a web pate detail region 129.

Figure 7:
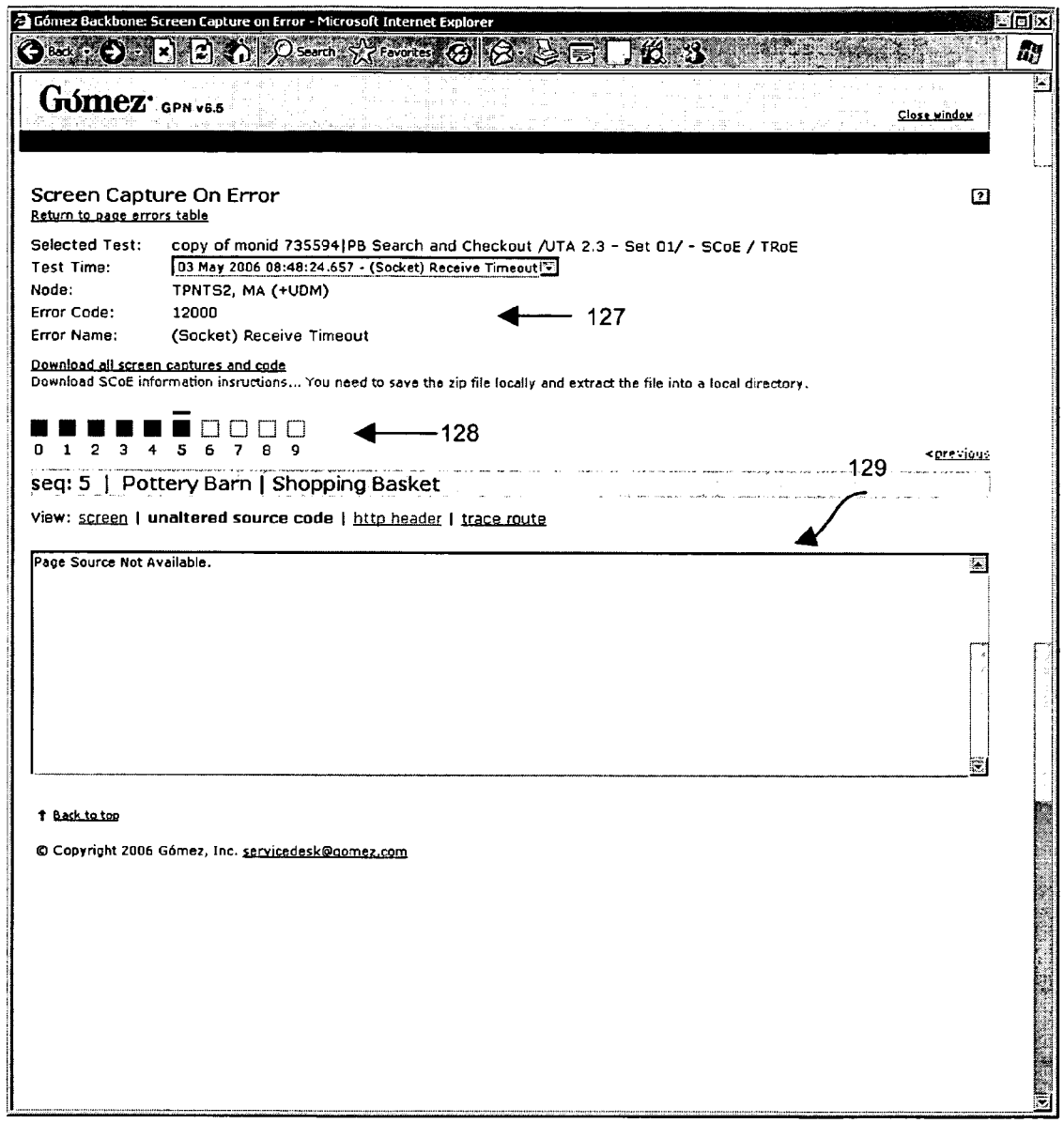
FIG. 7 is a screen shot of the contents of a container, the screen shot depicting a display of source code of an unsuccessfully executed web page, according to one embodiment disclosed herein.

FIG. 7 is a screen shot of the contents of a container received from the agent 150 by the performance displaying process 145-2. The screen shot depicts a display of source code of an unsuccessfully executed web page 135. The source code is unaltered, that is, the source code has not been modified such that remotely located objects point to locally referenced objects. The screen shot includes a screen capture information region 127, a screen capture identification region 128 and a web pate detail region 129.

Figure 8:
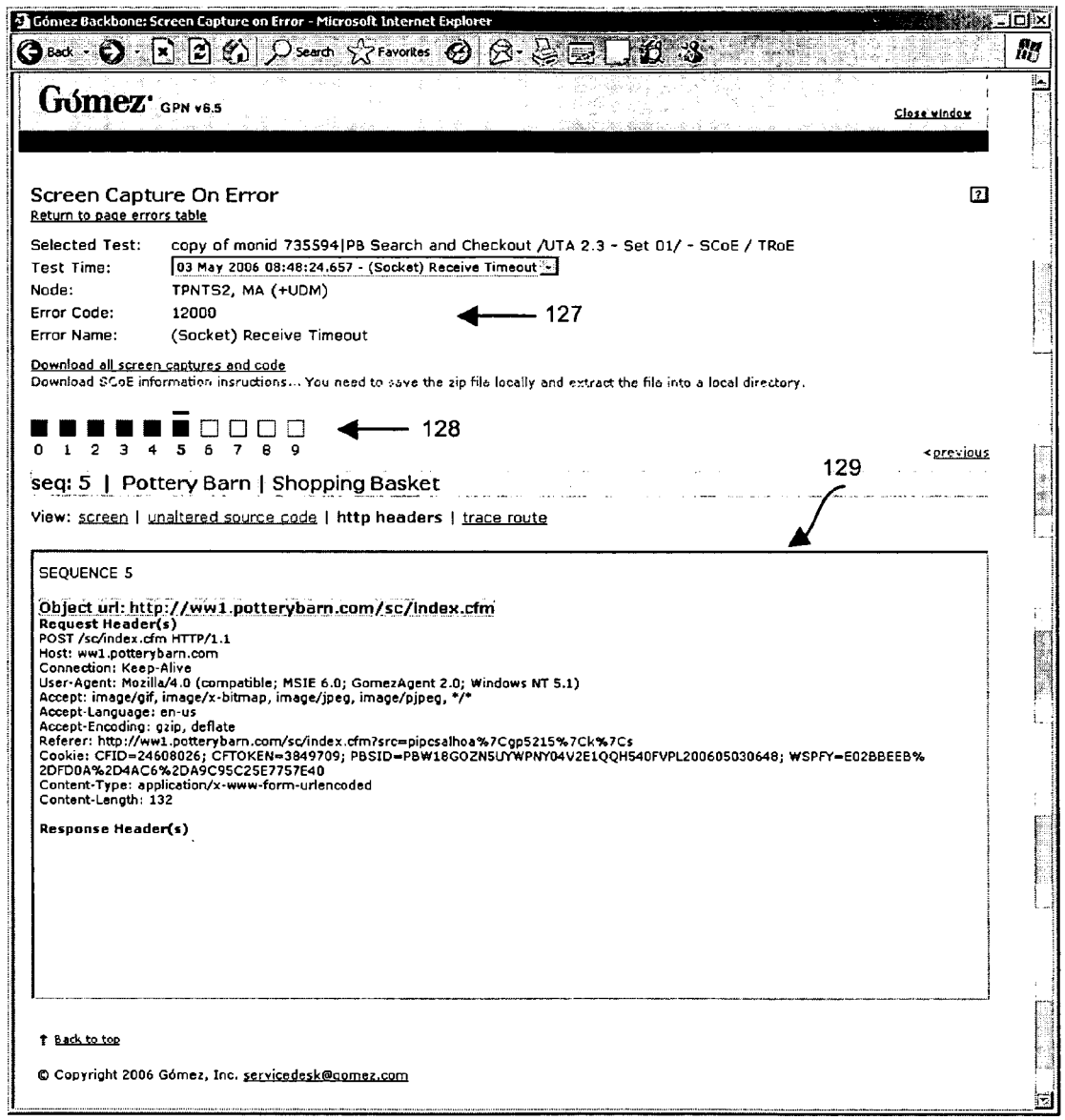
FIG. 8 is a screen shot of the contents of a container, the screen shot depicting a display of HTTP headers of an unsuccessfully executed web page, according to one embodiment disclosed herein.

FIG. 8 is a screen shot of the contents of a container received from the agent 150 by the performance displaying process 145-2. The screen shot depicts a display of HTTP headers of an unsuccessfully executed web page 135. The screen shot includes a screen capture information region 127, a screen capture identification region 128 and a web pate detail region 129.

Figure 9:
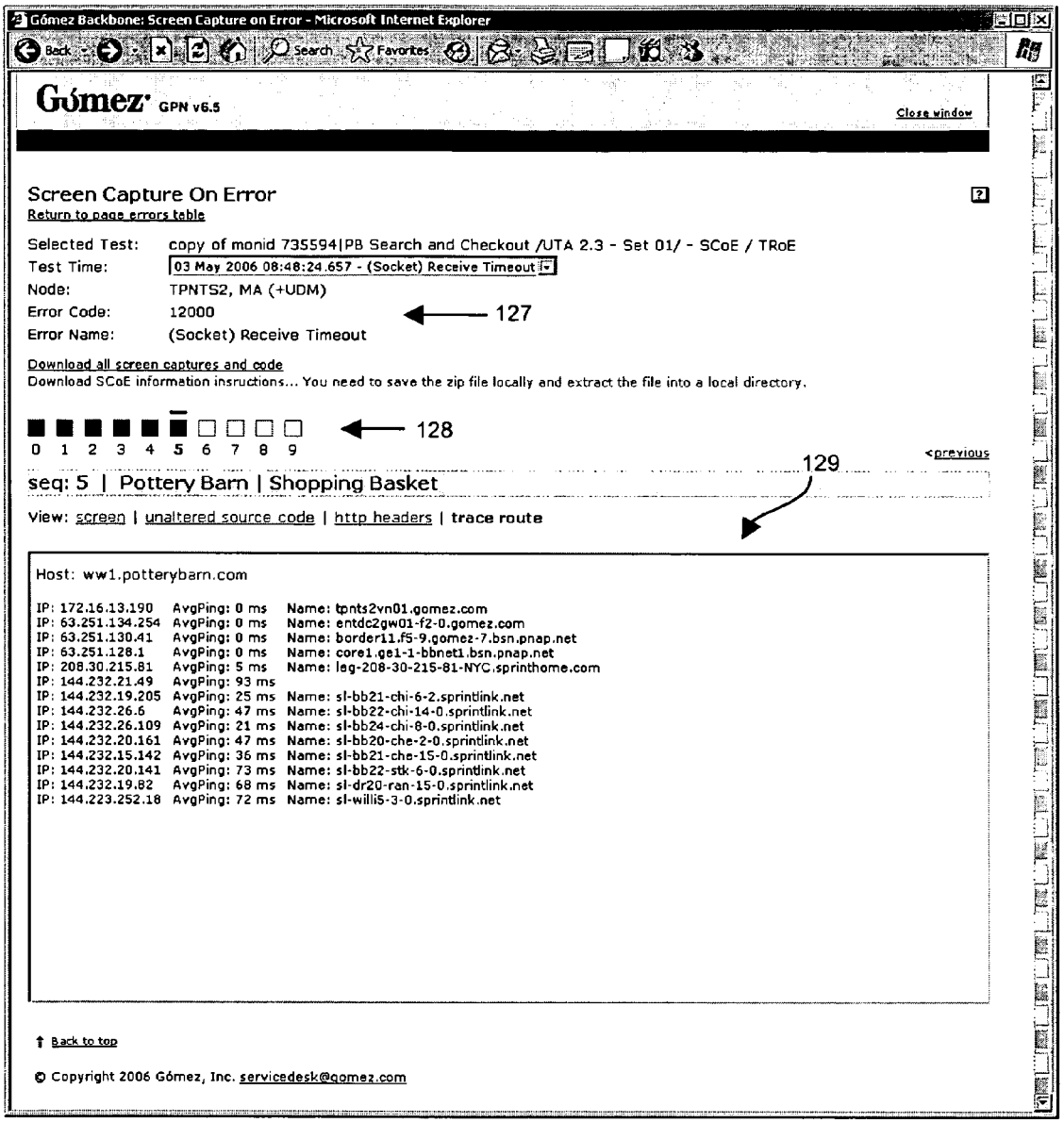
FIG. 9 is a screen shot of the contents of a container, the screen shot depicting a display of trace route information of an unsuccessfully executed web page, according to one embodiment disclosed herein.

FIG. 9 is a screen shot of the contents of a container received from the agent 150 by the performance displaying process 145-2. The screen shot depicts a display of trace route information of an unsuccessfully executed web page 135. The screen shot includes a screen capture information region 127, a screen capture identification region 128 and a web pate detail region 129.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 10:
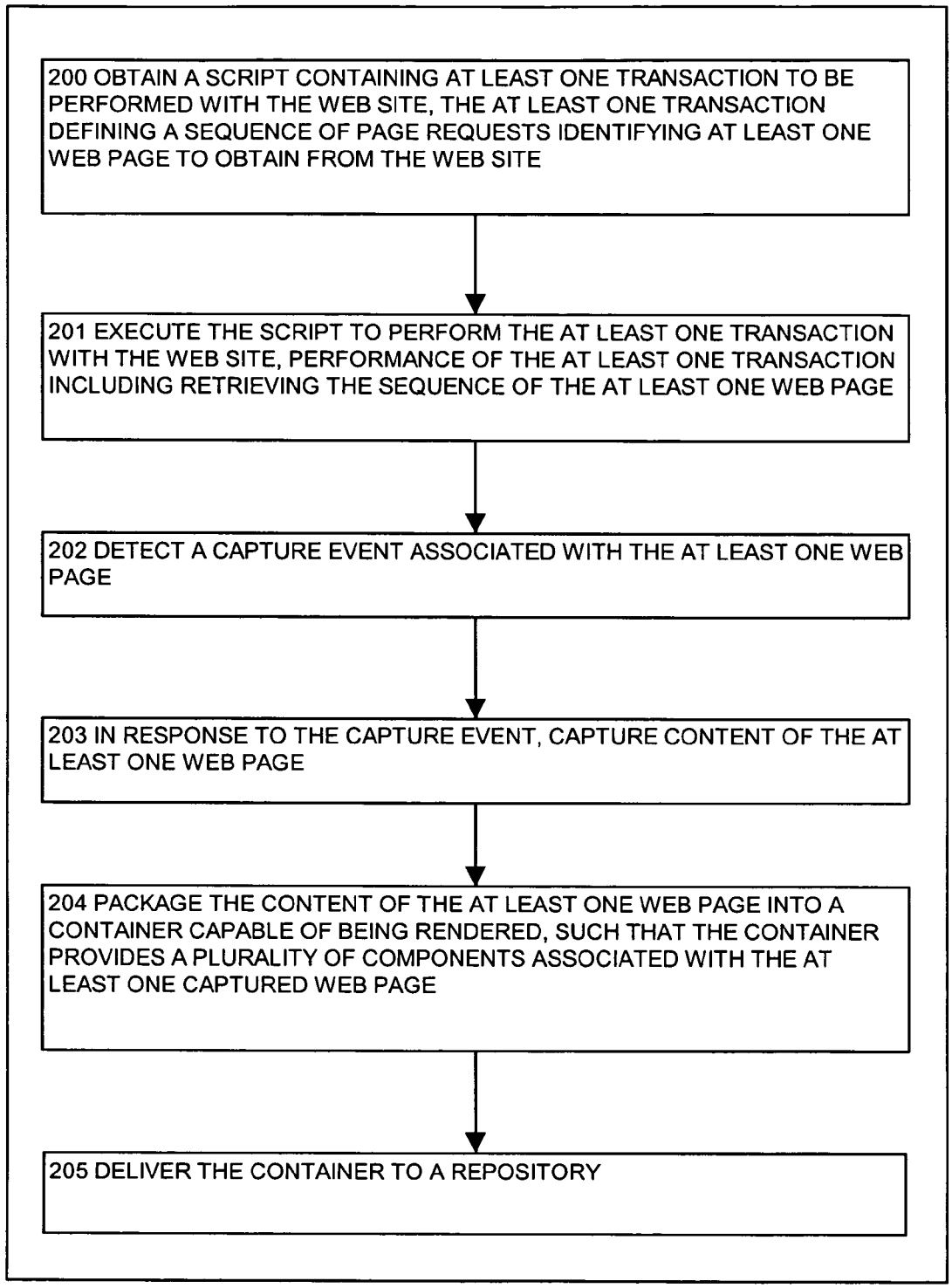
FIG. 10 illustrates a flowchart of a procedure performed by the system of FIG. 1 when the agent process obtains a script containing at least one transaction to be performed with the web site, according to one embodiment disclosed herein.

FIG. 10 is a flowchart of the steps performed by the agent 150 when it obtains a script containing at least one transaction to be performed with the web site, the transaction defining a sequence of page requests identifying at least one web page to obtain from the web site.

In step 200, the agent 150 obtains a script containing at least one transaction to be performed with the web site. The transaction defines a sequence of page requests identifying at least one web page to obtain from the web site. In an example configuration, the agent 150 obtains one or more scripts 180 from the agent command and control process 160. Each script 180 defines one or more transactions that may be performed with one or more of the web servers 130 operating in the web server computer systems 107. The agent 150 issues a request 192 (e.g., an HTTP GET request) for the web page 135 to be served from the web site using the uniform resource locator specified in a page request.

In step 201, the agent 150 executes the script 180 to perform the transaction with the web site. Performance of the transaction includes retrieving the sequence of the web page 135. In an example configuration, the agent 150 executes the transaction(s) defined within the script 180 in conjunction with the web server 130 to perform the scripted transaction on the web site. During performance of the transaction, the agent 150 is able to collect detailed performance metrics 190 concerning all aspects performance of the transaction with respect to each web page involved in the transaction.

In step 202, the agent 150 detects a capture event associated with the web page 135. In an example configuration, the capture event is an error on the web page 135. As the script 180 executes, a plurality of transactions are performed on the web site. For example, a transaction could entail performing a purchasing transaction on a retail website using the online shopping cart provided by the web site. As the script executes, performing the online purchasing transaction, an error message appears in the online shopping cart. The agent 150 detects that this capture event (i.e., the error message appearing in the online shopping cart) occurred on the web page 135. The capture event can be content based (i.e. detecting content on a return page that is missing, or that specifies content indicating an error, etc.), or can be a protocol error, or any other type of error. In some embodiments, the capture event can be user defined.

In step 203, the agent 150 in response to the capture event, captures content of the web page(s) 135 of the transaction. Capturing of the web page contents in one embodiment involves accessing a document object model to retrieve the entire page contents—both visible if the page were to be displayed on a graphical user interface, and "behind-the-scenes" data such as cookies, page URL, JavaScript, protocol data and so forth.

In step 204, the agent 150 packages the content of the web page 135 into a container capable of being rendered, such that the container provides a plurality of components associated with the captured web page 135. Packaging the page can include converting references in the page to local copies of objects in the page, instead of keeping those references (e.g. URLs) referencing remote objects. The container is capable of being rendered such that all remotely located components (i.e., objects on the web page 135, URLs, etc) on the web page 135 are now locally stored. Therefore, the web page 135 that is contained within the container is capable of being fully rendered without accessing any remotely located components or objects.

In step 205, the agent 150 delivers the container to a repository computer system 108. In an example configuration, the agent 150 packages the content of the web page 135 into a container and delivers the container to a repository computer system 108.

FIG. 11 is a flowchart of the steps performed by the agent 150 when, in response to the capture event, that agent captures content of the web page 135.

In step 206, the agent 150 in response to the capture event, captures content of the web page 135.

In step 207, the agent 150 identifies in the script 180, a capture event definition indicating a condition that may exist during retrieval of the web page 135 in the transaction. The capture event includes either (or both) of a user 118 defined capture event, or an error capture event.

In step 208, the agent 150 identifies a user defined capture event including one or more of:
i) A timing threshold, specified by a user 118 that has been exceeded. In an example configuration, a user 118 can specify, within the script 180, a timing threshold indicating, for example, how long a transaction should take to complete. For example, the script 180 may execute transactions for performing an online purchase. A user 118 may specify a time threshold that indicates how long after a customer (in this case, the customer is the automated script 180 executing the transactions a customer would make to make an online purchase on the website) selects a button to complete the purchase that a 'Thank you' web page 135 appears on the web site.
ii) A user supplied test datum that does not match with a component of the web page. In an example configuration, a user 118 can indicate a content match that should occur on the web page 135 on which the transaction is executing. For example, a user 118 can specify that the "ThankYou" web page 135 that appears after a customer (in this case, the customer is the automated script 180 executing the transactions a customer would make to make an online purchase on the website) completes an online transaction must include an up sell advertisement that encourages the customer to add on to the online purchase at a discount to the customer.
iii) A user supplied test datum that purposely triggers a false error. In an example configuration, a user 118 can supply the script 180 with data that purposely triggers a false error, resulting in the capturing of content of the web page 135. For example, a user 118 may want to verify the content of a web page 135 on a server that resides overseas. The user 118 supplies the test script 180 with data that triggers the capture of the web page 135 on that server residing overseas at a particular time. For example, the user 118 may specify that the capturing of the web page 135 content should occur at midnight on the server that resides overseas. The data supplied to the script 180 would include a timestamp check that would trigger the capture event.

Alternatively, in step 209, the agent 150 identifies an error capture event including one or more of:
i) A timing threshold that has been exceeded. In an example configuration, the script is configured to trigger a capture event if a specified timing threshold, for example, the loading of a web page 135, has been exceeded.
ii) A uniform resource locator error that has occurred. In an example configuration, the script is configured to trigger a capture event if a URL does not resolve to the proper web page 135.
iii) A network error that has occurred. In an example configuration, the script is configured to trigger a capture event if a network error, such as DNS failure.
iv) An object error that has occurred, the object identified as a component of the web page. In an example configuration, the script is configured to trigger a capture event if an object residing on the web page 135, such as an image, is not found.
v) A byte count associated with the web page. In an example configuration, the script is configured to trigger a capture event if a byte count of the web page, exceeds a specified threshold.

FIG. 12 is a flowchart of the steps performed by the agent 150 when, in response to the capture event, the agent captures content of the web page 135.

In step 210, the agent 150, in response to the capture event, captures content of the web page 135.

In step 211, the agent 150 receives a request to capture the content of the web page 135 upon an occurrence of an error on the web page 135. The request is provided by a switch in the script 180 executing to monitor the web page 135. In an example configuration, the script 180 is configured to capture the content of the web page 135 upon detection of an error. As the script 180 executes, a plurality of transactions are performed on the web site. When an error on the web page 135 occurs, the switch in the script 180 triggers the capture of the content of the web page 135.

Alternatively, in step 212, the agent 150 receives a request to capture one or more of:
i) a visual representation of locally stored content rendered in a web browser
ii) at least one header, such as an HTTP header, associated with the web page 135
iii) a trace route associated with the web server computer system 107 that hosts the web page 135.

In step 213, the agent 150 captures a plurality of components including visible and non visible components associated with the web page 135. In an example configuration, the agent 150 captures the visible components of the web pages, such as the text on the web pages and any images, URLs, etc on the web page 135. Additionally, the agent 150 captures the non visible components on the web pages, for example, such as the Cascading Style Sheets (CSS) that are used to format the web page 135, a URL of the page, cookies for the page and so forth. The agent can walk the DOM tree for the page to obtain all page data.

In step 214, the agent 150 traverses the web page 135 to identify each of the components within the plurality of components on the web page 135. In an example configuration, the agent 150 crawls the Document Object Model (DOM) that represents the web page 135, and identifies each of the components (i.e., text, images, URLs, CSS, cookies, etc) on the web page 135.

In step 215, the agent 150 locally stores a copy of each of the components within the plurality of components. In an example configuration, the agent 150 crawls the Document Object Model (DOM), and stores locally a copy of each of the components (i.e., text, images, URLs, CSS, etc) identified on the web page 135 during the traversal of the web page 135 by the agent 150.

FIG. 13 is a flowchart of the steps performed by the agent 150 when it traverses the web page 135 to identify each of the components within the plurality of components on the web page 135.

In step 216, the agent 150 traverses the web page 135 to identify each of the components within the components on the web page 135. In an example configuration, the agent 150 crawls the Document Object Model (DOM) that represents the web page 135, and identifies each of the components (i.e., text, images, URLs, CSS, etc) on the web page 135.

In step 217, the agent 150 identifies at least one component in the plurality of components as a reference to a remotely located object. In an example configuration, the agent traverses the web page 135 to identify each of the components within the plurality of components on the web page 135, and identifies a URL pointing to an image located on a server overseas.

In step 218, the agent 150 stores a copy of the remotely located object locally such that the copy of the remotely located object is a locally stored object. In an example configuration, the agent traverses the web page 135 to identify each of the components within the plurality of components on the web page 135, and identifies a URL pointing to an image located on a server overseas. The agent obtains a copy of the image located on the server overseas, and stores a copy locally of that image.

In step 219, the agent 150 modifies the reference to the remotely located object to reference the locally stored object. In an example configuration, the agent traverses the web page 135 to identify each of the components within the plurality of components on the web page 135, and identifies a URL pointing to an image located on a server overseas. The agent obtains a copy of the image located on the server overseas, and stores a copy locally of that image. The agent 150 modifies the source code of the web page 135 (i.e., the web pages captured by the agent 150 in response to the capture event) such that the URL pointing to the image located on a server overseas now points to the copy of the image that is now stored locally.

Alternatively, in step 220, the agent 150 identifies at least one component in the plurality of components as a style. In an example configuration, the agent 150, while traversing the web page 135 on which the capture event occurred, identifies a reference to a Cascading Style Sheet (CSS).

In step 221, the agent 150 identifies that a set of instructions defining the style resides separately from the plurality of components on the web page 135. In an example configuration, the agent 150, while traversing the web page 135 on which the capture event occurred, identifies a reference to a Cascading Style Sheet (CSS). The agent 150 traverses the web page 135 on which the capture event occurred, and identifies the file containing the CSS formatting code. The file containing the CSS formatting code is a separate file from the web page 135 on which the capture event occurred.

In step 222, the agent 150 captures a copy of the set of instructions defining the style. In an example configuration, the agent 150, while traversing the web page 135 on which the capture event occurred, identifies a reference to a Cascading Style Sheet (CSS). The agent 150 traverses the web page 135 on which the capture event occurred, and identifies the file containing the CSS formatting code. The file containing the CSS formatting code is a separate file from the web page 135 on which the capture event occurred. The agent 150 saves a copy locally of the file containing the CSS formatting code (i.e., the CSS file).

FIG. 14 is a flowchart of the steps performed by the agent 150 when it traverses the web page 135 to identify each of the components within the plurality of components on the web page 135.

In step 223, the agent 150 traverses the web page 135 to identify each of the components within the plurality of components on the web page 135. In an example configuration, the agent 150 crawls the Document Object Model (DOM) that represents the web page 135, and identifies each of the components (i.e., text, images, URLs, CSS, etc) on the web page 135.

In step 224, the agent 150 identifies at least one component in the plurality of components as a data field for receiving input from a user. In an example configuration, the agent 150 identifies that the web page 135 contains at least one form field for accepting input from a user 118. The agent 150 captures the empty form field during the content capture of the web page 135.

In step 225, the agent 150 identifies the data field contains input. In an example configuration, the agent 150 identifies that the web page contains at least one form field for accepting input from a user, and identifies that the form field contained user 118 entered input at the time the content of the web page 135 was captured by the agent 150.

In step 226, the agent 150 captures the data field containing the input. In an example configuration, the agent 150 identifies that the web page contains at least one form field for accepting input from a user, and identifies that the form field contained user 118 entered input at the time the content of the web page 135 was captured by the agent 150. The agent 150 then captures the user entered input that existed on the web page 135 at the time the content of the web page 135 was captured by the agent 150. Thus, in an example configuration, the agent 150 captures the web page 135 with both empty form fields, and form fields containing input provided by a user 118. When a capture event, such as an error occurs, it is possible to obtain a copy of the web page 135 depicting the contents of the form fields at the time of error, as well as a copy of the web page 135 with blank form fields.

FIG. 15 is a flowchart of the steps performed by the agent 150 when it packages the content of the web page 135 into a container capable of being rendered, such that the container provides a plurality of components associated with the captured web page 135.

In step 227, the agent 150 the agent 150 packages the content of the web page 135 into a container capable of being rendered, such that the container provides a plurality of components associated with the captured web page 135.

In step 228, the agent 150 archives a plurality of web pages 135-N in the container. In an example configuration, the archive includes converting each reference to a remote object within the web page to a reference to a local version of that object. As an example, if the web page includes an embedded URL referencing a remote graphic, when the page was initially obtained, the URL was referenced to also obtain a local copy of this graphic. This local copy of the graphic is saved as part of the web page, and the portion of the page containing the URL to that graphic is modified to include a reference to the local graphic, instead of the graphic located at the original URL. Thus all references in the web page that is captured are converted to local references.

In step 229, the agent 150 creates a container reference to the container. In an example configuration, container is a compressed archive file.

In step 230, the agent 150 transmits notification of the container reference. In an example configuration, the agent transmits notification of the container reference to a remote analysis facility that can either pull the container from the agent when the container is complete, or that notifies that analysis computer that the agent is about to transmit the container to the analysis computer.

In step 231, the agent 150 queues the container reference for delivery of the container. This allows the analysis computer to obtain a copy of the capture web page for further analysis.

Figure 16:
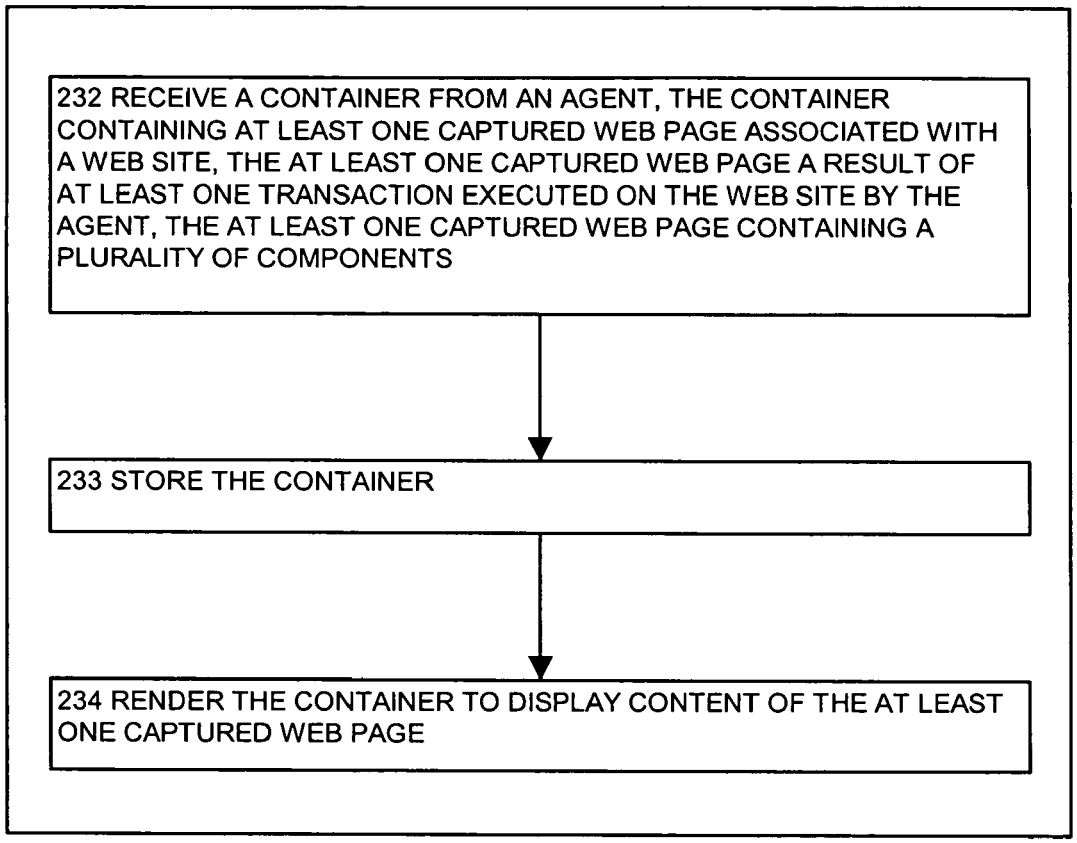
FIG. 16 illustrates a flowchart of a procedure performed by the system of FIG. 2 when the performance displaying process receives a container from an agent, according to one embodiment disclosed herein.

FIG. 16 is a flowchart of the steps performed by the performance displaying process 145-2 when it receives a container from an agent 150. The container contains at least one captured web page 135 associated with a web site. The captured web page 135 a result of at least one transaction executed on the web site by the agent 150, and the captured web page 135 contains a plurality of components.

In step 232, the performance displaying process 145-2 receives a container from an agent 150. The container contains at least one captured web page 135 associated with a web site. The captured web page 135 a result of at least one transaction executed on the web site by the agent 150, and the captured web page 135 containing a plurality of components.

In step 233, the performance displaying process 145-2 stores the container. In an example configuration, the performance displaying process 145-2 receives a container containing at least one captured web page 135 associated with a web site from an agent 150, and stores the container.

FIG. 17 is a flowchart of the steps performed by the performance displaying process 145-2 when it renders the container to display content of the captured web page 135.

In step 234, the performance displaying process 145-2 renders the container to display content of the captured web page 135. FIG. 3 depicts the performance displaying process 145-2 displaying a screen shot of a captured web page 135 within a web page detail region 129.

In step 235, the performance displaying process 145-2 renders the content of the captured web page 135. The rendering can include one or more of:
  i) a screen capture information region 127
  ii) a screen capture identification region 128
  iii) a web page detail region 129.

In step 236, the performance displaying process 145-2 renders the screen capture information region 127 to include one of more of:
  i) a script identifier identifying a script 180 that invokes the transaction to monitor the captured web page 135.
  ii) a timestamp associated with the script 180.
  iii) an server identifier identifying a server 130 on which the script 180 is executing
  iv) an error code associated with the script 180
  v) an error name associated with the script 180
  vi) an option to display the contents of the container.

FIG. 18 is a flowchart of the steps performed by the performance displaying process 145-2 when it renders the container to display content of the captured web page 135.

In step 237, the performance displaying process 145-2 renders the container to display content of the captured web page 135. FIG. 3 depicts the performance displaying process 145-2 displaying a screen shot of a captured web page 135 within a web page detail region 129.

In step 238, the performance displaying process 145-2 renders at least one web page identifier identifying the captured web page 135 contained within the container. In an example configuration, the performance displaying process 145-2 displays at least one web page identifier in the screen capture identification region 128. For example, each web page requested in the sequence of transactions performed on the web site by the script 180, is identified in the screen capture identification region 128. In an example configuration, each web page identifier is represented by an icon representing a respective web page 135 requested by the transactions in the script 180.

In step 239, the performance displaying process 145-2 renders the web page identifier to identify one or more of:
  i) A web page 135 successfully executed by a script 180. In an example configuration, a green colored icon represents a successfully executed web page 135.
  ii) A web page 135 unsuccessfully executed by the script 180. In an example configuration, a red colored icon represents an unsuccessfully executed web page 135. For example, as the script 180 executes, transactions within the script 180 request web pages 135. When a capture event occurs on a web page 135, that web page 135 on which the capture event occurred, is represented within the screen capture identification region 128 as a red colored icon.
  iii) A web page 135 not executed by the script 180. In an example configuration, a white colored icon represents a web page 135 not executed by the script 180. For example, as the script 180 executes, transactions within the script 180 request a sequence of web pages 135. When a capture event occurs on a web page 135, the transaction halts, and the those web pages 135 within the sequence of web pages 135 that were not requested by the transactions, are represented within the screen capture identification region 128 as a white colored icon.

In step 240, the performance displaying process 145-2 renders the web page detail region 129 to include one of more of:
  i) A screen shot of the least one captured web page 135. In an example configuration, a screen shot of the web page 135, as the web page 135 appeared at the time the capture event occurred, is displayed within the web page detail region 129.
  ii) A source code listing of the least one captured web page 135. In an example configuration, source code associated with the web page 135 (on which the capture event occurred) is displayed within the web page detail region 129. The source code is unaltered, that is, the source code has not been modified such that remotely located objects point to locally referenced objects.
  iii) At least one header associated with the least one captured web page 135. In an example configuration, HTTP headers associated with the web page 135 on which the capture event occurred are displayed within the web page detail region 129.
  iv) A trace route associated with the web server computer system 107 that hosts the least one captured web page 135. In an example configuration, trace route information associated the web page 135 on which the capture event occurred are displayed within the web page detail region 129.

In step 241, the performance displaying process 145-2 renders the screen shot of the least one captured web page 135 displayed at the time an error occurred, the error associated with a script invoking the transaction. In an example configuration, during execution of the script 180, an error occurs on a web page 135. The agent 150 captures the content of the web page 135 at the time at which the capture event (i.e., the error) occurred, and packages the content of the web page 135 into a container that is received by the performance displaying process 145-2. The performance displaying process 145-2 displays the screen shot of the captured web page 135 displayed in the web page detail region 129. The captured web page 135 is rendered to display the web page 135 at the time an error occurred.

While the system and method have been particularly shown and described with references to configurations thereof, it will be understood by those skilled in the art that various changes in form and details may be made therein without departing from the scope of embodiments disclosed herein encompassed by the appended claims. Accordingly, the present embodiments disclosed herein are not intended to be limited by the example configurations provided above.

What is claimed is:

1. Using an agent, a computer-implemented method in which a computer system initiates execution of software instructions stored in memory for measuring and displaying performance associated with a web site, the computer-implemented method comprising:
  obtaining a script, at a remote agent, containing at least one transaction to be performed with the web site, the at least one transaction defining a sequence of page requests identifying at least one web page to obtain from the web site;

executing the script to perform the at least one transaction with the web site, performance of the at least one transaction including retrieving the sequence of the at least one web page;

detecting a capture event associated with the at least one web page, detecting the capture event including receiving a request to capture a visual representation of locally stored content according to how the locally stored content would be rendered in a web browser;

in response to the capture event, capturing content of the at least one web page, capturing content including capturing a plurality of components including visible and non visible components associated with the at least one web page;

packaging the content of the at least one web page into a container capable of being rendered, such that the container provides a plurality of components associated with the at least one captured web page;

delivering the container to a repository wherein detecting a capture event associated with the at least one web page comprises:

identifying in the script, a capture event definition indicating a condition that may exist during retrieval of the at least one web page in the at least one transaction, the capture event including at least one of:

i) a user defined capture event; and ii) an error capture event;

wherein identifying in the script, a capture event definition indicating a condition that may exist during retrieval of the at least one web page in the at least one transaction, the capture event including at least one of a user defined capture event, and an error capture event comprises:

identifying a user defined capture event including at least one of:

i) a timing threshold, specified by a user, that has been exceeded;

ii) a user supplied test datum that does not match with a component of the web page; and iii) a user supplied test datum that purposely triggers a false error.

2. The computer-implemented method of claim 1 wherein detecting a capture event associated with the at least one web page comprises:

receiving a request to capture the content of the at least one web page upon an occurrence of an error on the at least one web page, the request provided by a switch in the script executing to monitor the at least one web page.

3. The computer-implemented method of claim 1 wherein identifying in the script, a capture event definition indicating a condition that may exist during retrieval of the at least one web page in the at least one transaction, the capture event including at least one of a user defined capture event, and an error capture event comprises:

identifying an error capture event including at least one of:

i) a timing threshold that has been exceeded;

ii) a universal resource locator error that has occurred;

iii) a network error that has occurred;

iv) an object error that has occurred, the object identified as a component of the web page; and v) a byte count associated with the at least one web page.

4. The computer-implemented method of claim 1 wherein detecting a capture event associated with the at least one web page comprises:

receiving a request to capture at least one of:

i) at least one header associated with the at least one web page; and ii) a trace route associated with the web server computer system that hosts the at least one web page.

5. The computer-implemented method of claim 1 wherein capturing a plurality of components including visible and non visible components associated with the at least one web page comprises:

traversing the at least one web page to identify each of the components within the plurality of components on the at least one web page; and locally storing a copy of each of the components within the plurality of components.

6. The computer-implemented method of claim 5 wherein traversing the at least one web page to identify each of the components within the plurality of components on the at least one web page comprises:

identifying at least one component in the plurality of components as a reference to a remotely located object;

storing a copy of the remotely located object locally such that the copy of the remotely located object is a locally stored object; and modifying the reference to the remotely located object to reference the locally stored object.

7. The computer-implemented method of claim 5 wherein traversing the at least one web page to identify each of the components within the plurality of components on the at least one web page comprises:

identifying at least one component in the plurality of components as a style;

identifying that a set of instructions defining the style resides separately from the plurality of components on the web page; and capturing a copy of the set of instructions defining the style.

8. The computer-implemented method of claim 5 wherein traversing the at least one web page to identify each of the components within the plurality of components on the at least one web page comprises:

identifying at least one component in the plurality of components as a data field for receiving input from a user; and wherein identifying at least one component in the plurality of components as a data field for receiving input from a user comprises:

identifying the data field contains input; and capturing the data field containing the input.

9. The computer-implemented method of claim 1 wherein packaging the content of the at least one web page into a container capable of being rendered, such that the container provides a plurality of components associated with the at least one captured web page comprises:

archiving a plurality of web pages in the container;

creating a container reference to the container;

transmitting notification of the container reference; and queuing the container reference for delivery of the container.

10. A computerized device comprising:

a memory;

a processor;

a communications interface;

an interconnection mechanism coupling the memory, the processor and the communications interface;

wherein the memory is encoded with an agent application that when executed on the processor is capable of for measuring performance associated with a web site on the computerized device by performing the operations of:

obtaining a script containing at least one transaction to be performed with the web site, the at least one transaction defining a sequence of page requests identifying at least one web page to obtain from the web site;
executing the script to perform the at least one transaction with the web site, performance of the at least one transaction including retrieving the sequence of the at least one web page;
detecting a capture event associated with the at least one web page, detecting the capture event including receiving a request to capture a visual representation of locally stored content according to how the locally stored content would be rendered in a web browser;
in response to the capture event, capturing content of the at least one web page, capturing content including capturing a plurality of components including visible and non visible components associated with the at least one web page;
packaging the content of the at least one web page into a container capable of being rendered, such that the container provides a plurality of components associated with the at least one captured web page;
delivering the container to a repository
wherein detecting a capture event associated with the at least one web page comprises:
identifying in the script, a capture event definition indicating a condition that may exist during retrieval of the at least one web page in the at least one transaction, the capture event including at least one of:
i) a user defined capture event; and
ii) an error capture event;
wherein identifying in the script, a capture event definition indicating a condition that may exist during retrieval of the at least one web page in the at least one transaction, the capture event including at least one of a user defined capture event, and an error capture event comprises:
identifying a user defined capture event including at least one of:
i) a timing threshold, specified by a user, that has been exceeded;
ii) a user supplied test datum that does not match with a component of the web page; and
iii) a user supplied test datum that purposely triggers a false error.

11. A computer readable medium encoded with computer programming logic that when executed on a process in a computerized device provides performance measuring associated with a web site, the medium comprising:
instructions for obtaining a script containing at least one transaction to be performed with the web site, the at least one transaction defining a sequence of page requests identifying at least one web page to obtain from the web site;
instructions for executing the script to perform the at least one transaction with the web site, performance of the at least one transaction including retrieving the sequence of the at least one web page;
instructions for detecting a capture event associated with the at least one web page, detecting the capture event including receiving a request to capture a visual representation of locally stored content according to how the locally stored content would be rendered in a web browser;
in response to the capture event, instructions for capturing content of the at least one web page, capturing content including capturing a plurality of components including visible and non visible components associated with the at least one web page;
instructions for packaging the content of the at least one web page into a container capable of being rendered, such that the container provides a plurality of components associated with the at least one captured web page;
instructions for delivering the container to a repository;
wherein instructions for detecting a capture event associated with the at least one web page comprises:
instructions for identifying in the script, a capture event definition indicating a condition that may exist during retrieval of the at least one web page in the at least one transaction, the capture event including at least one of:
i) a user defined capture event; and
ii) an error capture event;
wherein instructions for identifying in the script, a capture event definition indicating a condition that may exist during retrieval of the at least one web page in the at least one transaction, the capture event including at least one of a user defined capture event, and an error capture event comprises:
instructions for identifying a user defined capture event including at least one of:
i) a timing threshold, specified by a user, that has been exceeded;
ii) a user supplied test datum that does not match with a component of the web page; and
iii) a user supplied test datum that purposely triggers a false error.

12. The computer-implemented method of claim 1, further comprising:
rendering the container to display content of the at least one captured web page to display content including:
a screen capture information region;
a screen shot identification region; and
a web page detail region.

13. The computer-implemented method of claim 12 wherein rendering the content of the at least one captured web page to include at least one of a screen capture information region, a screen shot identification region and a web page detail region comprises:
rendering the screen capture information region to include at least one of:
i) a script identifier identifying a script that invokes the at least one transaction to monitor the at least one captured web page;
ii) a timestamp associated with the script;
iii) an server identifier identifying a server on which the script is executing;
iv) an error code associated with the script;
v) an error name associated with the script; and
vi) an option to display the contents of the container.

14. The computer-implemented method of claim 12 wherein rendering the content of the at least one captured web page to include at least one of a screen capture information region, a screen shot identification region and a web page detail region comprises:
rendering at least one web page identifier identifying the at least one captured web page contained within the container; and
wherein rendering at least one web page identifier identifying the at least one captured web page contained within the container comprises:
rendering the at least one web page identifier to identify at least one of:
i) a web page successfully executed by a script;
ii) a web page unsuccessfully executed by the script; and
iii) a web page not executed by the script.

15. The computer-implemented method of claim 12 wherein rendering the content of the at least one captured web page to include at least one of a screen capture information region, a screen shot identification region and a web page detail region comprises:

rendering the web page detail region to include at least one of:
i) a screen shot of the least one captured web page;
ii) a source code listing of the at least one captured web page, the source code including unaltered source code;
iii) at least one header associated with the least one captured web page; and
iv) a trace route associated with the least one captured web page; and wherein rendering the web page detail region comprises:
rendering the screen shot of the least one captured web page displayed at the time an error occurred, the error associated with a script invoking the at least one transaction.

16. The computer-implemented method of claim 1, wherein executing the script includes accessing embedded scheduling information that indicates how frequently to execute the script within the remote agent; and wherein executing the script includes interacting with the website without rendering associated web pages on a graphical user interface.

17. The computer-implemented method of claim 5, further comprising:
rendering the container to display content of the at least one captured web page to display content including:
a screen capture information region;
a screen shot identification region; and
a web page detail region.

18. The computer-implemented method of claim 5 wherein rendering the content of the at least one captured web page to include at least one of a screen capture information region, a screen shot identification region and a web page detail region comprises:

rendering the screen capture information region to include at least one of:
i) a script identifier identifying a script that invokes the at least one transaction to monitor the at least one captured web page;
ii) a timestamp associated with the script;
iii) an server identifier identifying a server on which the script is executing;
iv) an error code associated with the script;
v) an error name associated with the script; and
vi) an option to display the contents of the container.

19. The computer-implemented method of claim 5 wherein rendering the content of the at least one captured web page to include at least one of a screen capture information region, a screen shot identification region and a web page detail region comprises:

rendering at least one web page identifier identifying the at least one captured web page contained within the container; and
wherein rendering at least one web page identifier identifying the at least one captured web page contained within the container comprises:

rendering the at least one web page identifier to identify at least one of:
i) a web page successfully executed by a script;
ii) a web page unsuccessfully executed by the script; and
iii) a web page not executed by the script.

20. The computer-implemented method of claim 5 wherein rendering the content of the at least one captured web page to include at least one of a screen capture information region, a screen shot identification region and a web page detail region comprises:

rendering the web page detail region to include at least one of:
i) a screen shot of the least one captured web page;
ii) a source code listing of the at least one captured web page;
iii) at least one header associated with the least one captured web page; and
iv) a trace route associated with the least one captured web page; and
wherein rendering the web page detail region comprises:
rendering the screen shot of the least one captured web page displayed at the time an error occurred, the error associated with a script invoking the at least one transaction.

21. The computer-implemented method of claim 5, wherein detecting a capture event associated with the at least one web page comprises:
identifying in the script, a capture event definition indicating a condition that may exist during retrieval of the at least one web page in the at least one transaction, the capture event including at least one of:
i) a user defined capture event; and
ii) an error capture event.

22. The computer-implemented method of claim 21 wherein identifying in the script, a capture event definition indicating a condition that may exist during retrieval of the at least one web page in the at least one transaction, the capture event including at least one of a user defined capture event, and an error capture event comprises:
identifying a user defined capture event including at least one of:
i) a timing threshold, specified by a user, that has been exceeded;
ii) a user supplied test datum that does not match with a component of the web page; and
iii) a user supplied test datum that purposely triggers a false error wherein identifying in the script, a capture event definition indicating a condition that may exist during retrieval of the at least one web page in the at least one transaction, the capture event including at least one of a user defined capture event, and an error capture event comprises:
identifying an error capture event including at least one of:
i) a timing threshold that has been exceeded;
ii) a universal resource locator error that has occurred;
iii) a network error that has occurred;
iv) an object error that has occurred, the object identified as a component of the web page; and
v) a byte count associated with the at least one web page.

* * * * *